July 25, 1944.　　A. G. RINDFLEISCH　　2,354,549
CARD CONTROLLED MECHANISM
Filed Jan. 27, 1940　　28 Sheets-Sheet 1

INVENTOR
ARTHUR G. RINDFLEISCH
BY
ATTORNEY

July 25, 1944.     A. G. RINDFLEISCH     2,354,549
CARD CONTROLLED MECHANISM
Filed Jan. 27, 1940     28 Sheets-Sheet 2

INVENTOR
ARTHUR G. RINDFLEISCH
BY H. A. Sparks
ATTORNEY

July 25, 1944.  A. G. RINDFLEISCH  2,354,549
CARD CONTROLLED MECHANISM
Filed Jan. 27, 1940   28 Sheets-Sheet 3

INVENTOR
ARTHUR G. RINDFLEISCH
BY
ATTORNEY

July 25, 1944. A. G. RINDFLEISCH 2,354,549
CARD CONTROLLED MECHANISM
Filed Jan. 27, 1940 28 Sheets-Sheet 4

INVENTOR
ARTHUR G. RINDFLEISCH
BY H. A. Spark
ATTORNEY

July 25, 1944.  A. G. RINDFLEISCH  2,354,549
CARD CONTROLLED MECHANISM
Filed Jan. 27, 1940  28 Sheets-Sheet 5

INVENTOR
ARTHUR G. RINDFLEISCH
BY
ATTORNEY

July 25, 1944.　　　A. G. RINDFLEISCH　　　2,354,549
CARD CONTROLLED MECHANISM
Filed Jan. 27, 1940　　28 Sheets-Sheet 6
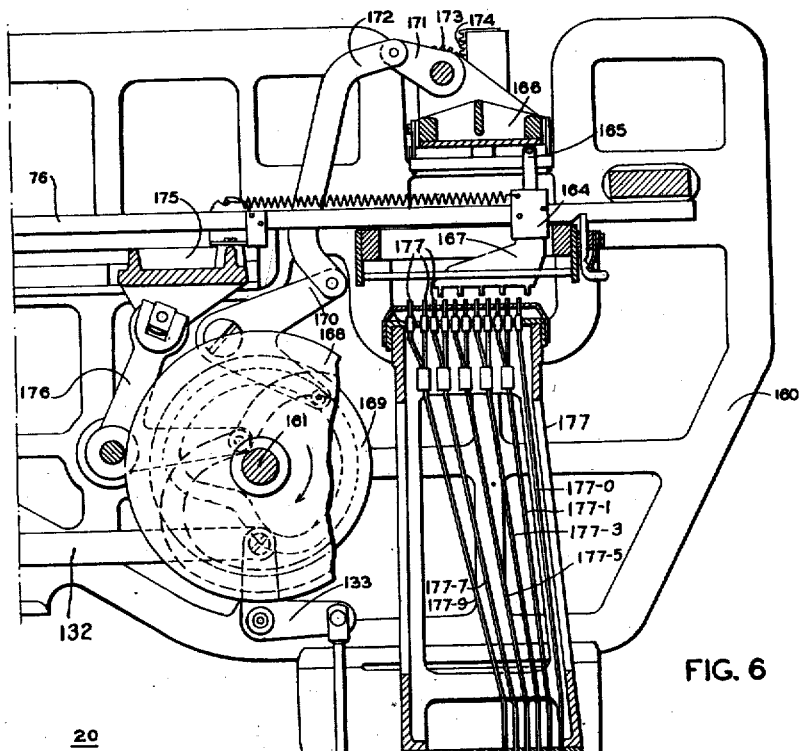
FIG. 6
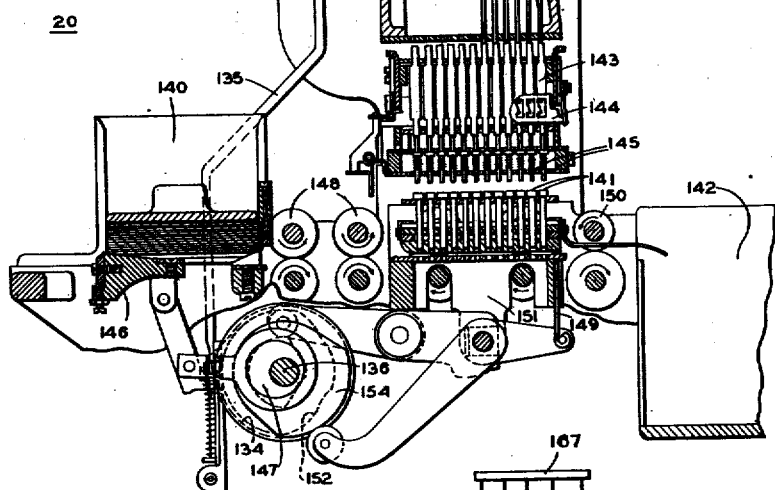
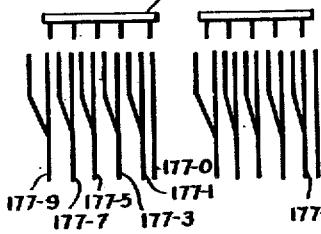
FIG.6A　FIG.6B.　FIG.6C.
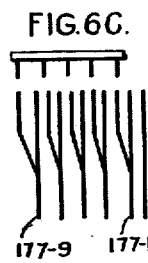
FIG.6D.
INVENTOR
ARTHUR G. RINDFLEISCH
BY *W. A. Sparks*
ATTORNEY

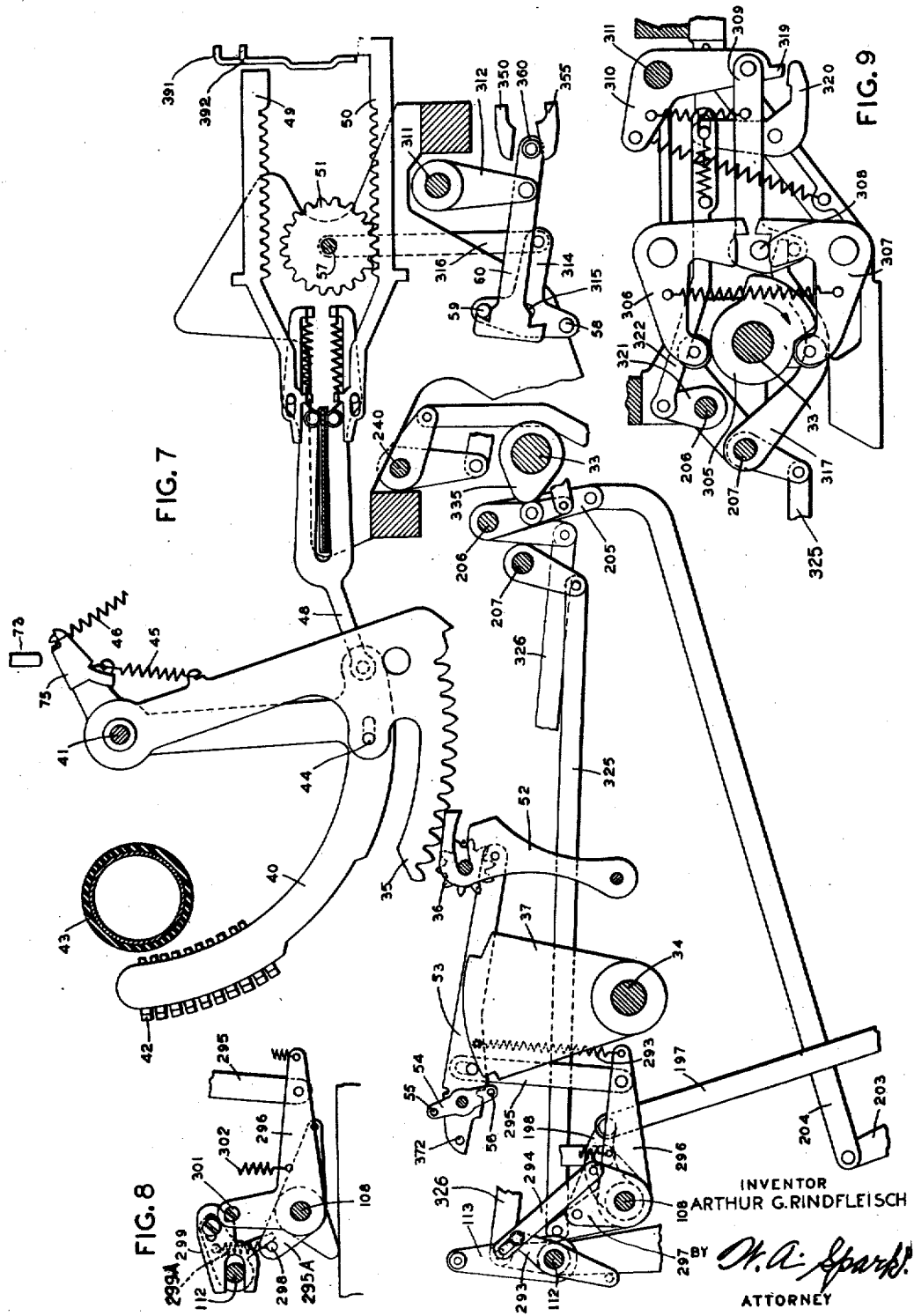

July 25, 1944.  A. G. RINDFLEISCH  2,354,549
CARD CONTROLLED MECHANISM
Filed Jan. 27, 1940     28 Sheets-Sheet 8
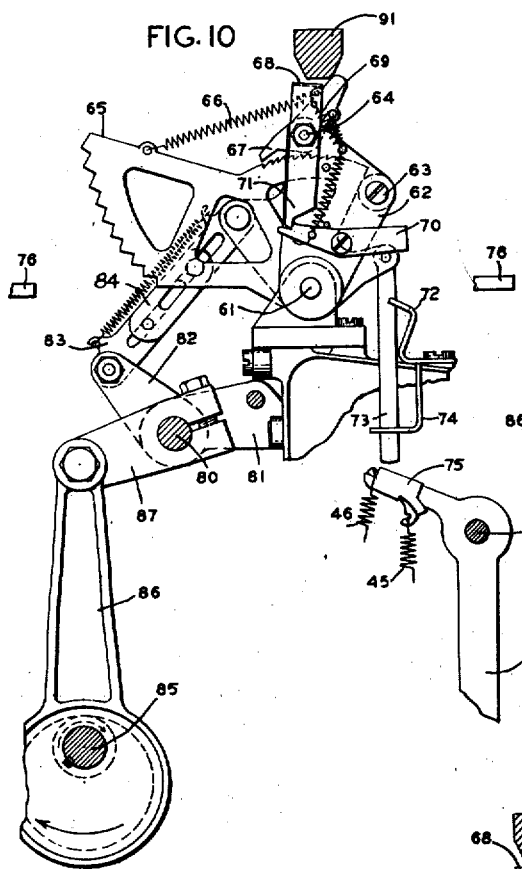
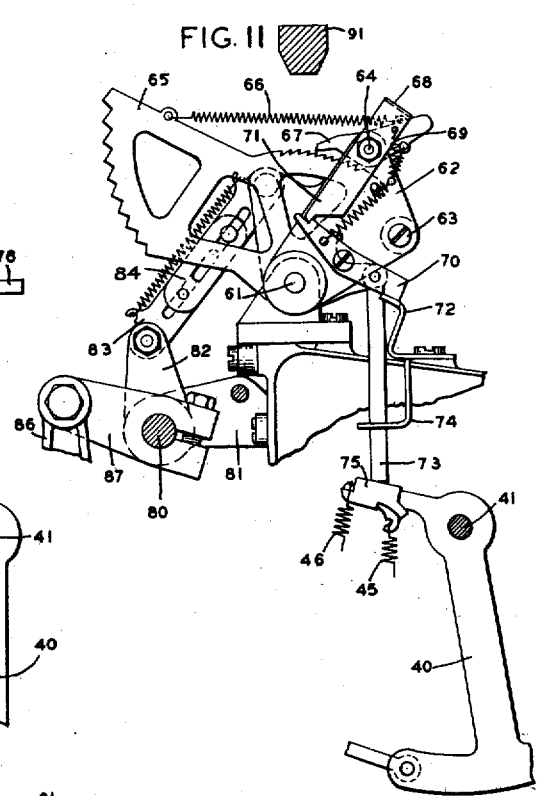
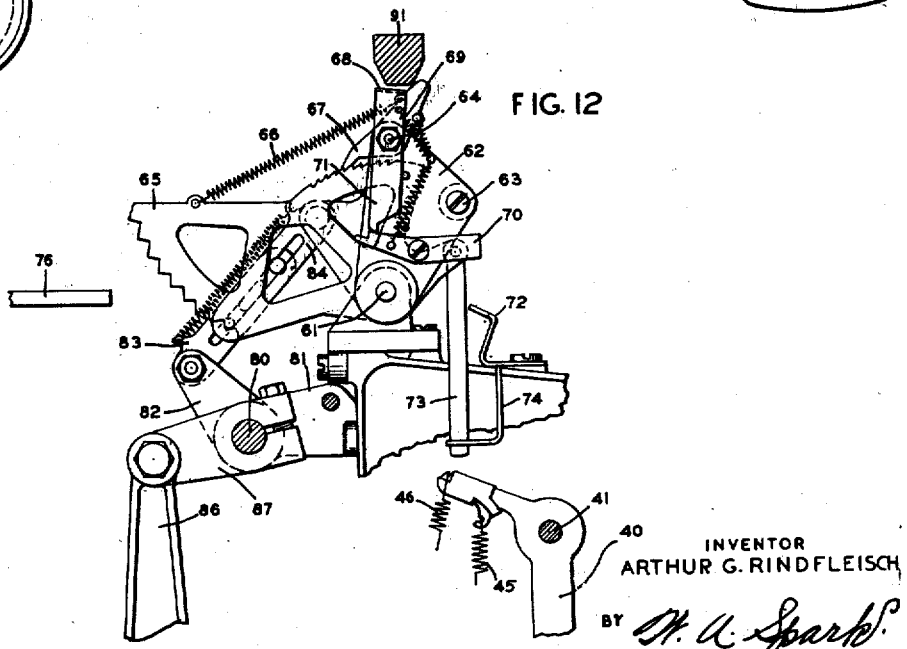
INVENTOR
ARTHUR G. RINDFLEISCH
BY *W. A. Sparks*
ATTORNEY

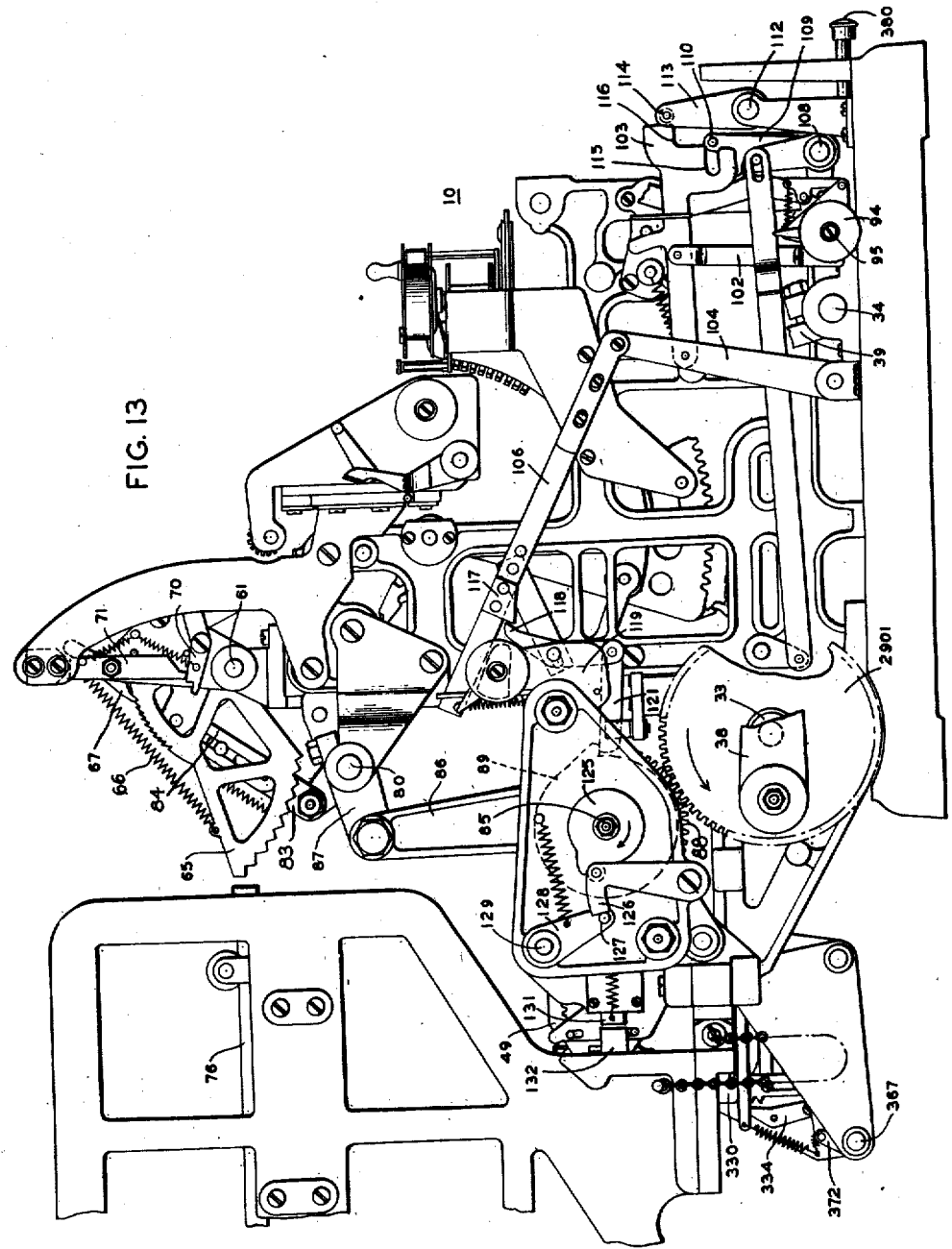

July 25, 1944.  A. G. RINDFLEISCH  2,354,549
CARD CONTROLLED MECHANISM
Filed Jan. 27, 1940  28 Sheets-Sheet 10

INVENTOR
ARTHUR G. RINDFLEISCH
BY W. A. Sparks
ATTORNEY

July 25, 1944.  A. G. RINDFLEISCH  2,354,549
CARD CONTROLLED MECHANISM
Filed Jan. 27, 1940  28 Sheets-Sheet 11

INVENTOR
ARTHUR G. RINDFLEISCH
BY W. A. Sparks
ATTORNEY

July 25, 1944.  A. G. RINDFLEISCH  2,354,549
CARD CONTROLLED MECHANISM
Filed Jan. 27, 1940  28 Sheets-Sheet 13

INVENTOR
ARTHUR G. RINDFLEISCH
BY *H. A. Spark*
ATTORNEY

July 25, 1944.  A. G. RINDFLEISCH  2,354,549
CARD CONTROLLED MECHANISM
Filed Jan. 27, 1940   28 Sheets-Sheet 16

INVENTOR
ARTHUR G. RINDFLEISCH
BY *H. A. Spark*
ATTORNEY

July 25, 1944.  A. G. RINDFLEISCH  2,354,549
CARD CONTROLLED MECHANISM
Filed Jan. 27, 1940   28 Sheets-Sheet 17

INVENTOR
ARTHUR G. RINDFLEISCH
BY *H. A. Sparks*
ATTORNEY

July 25, 1944.  A. G. RINDFLEISCH  2,354,549
CARD CONTROLLED MECHANISM
Filed Jan. 27, 1940   28 Sheets-Sheet 18

INVENTOR
ARTHUR G. RINDFLEISCH
BY W. A. Sparks
ATTORNEY

July 25, 1944.     A. G. RINDFLEISCH     2,354,549
CARD CONTROLLED MECHANISM
Filed Jan. 27, 1940     28 Sheets-Sheet 19

INVENTOR
ARTHUR G. RINDFLEISCH
BY
ATTORNEY

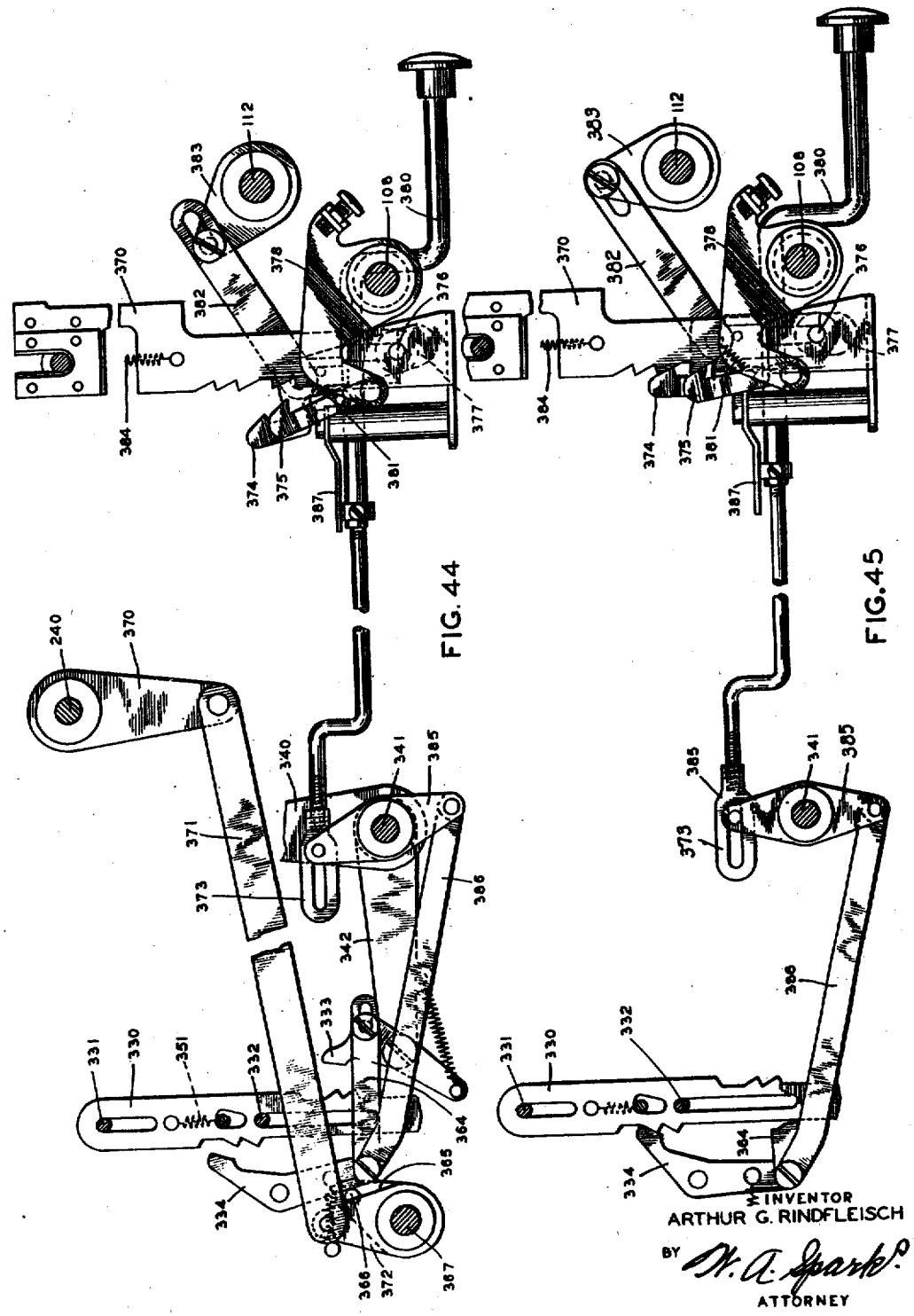

July 25, 1944.  A. G. RINDFLEISCH  2,354,549
CARD CONTROLLED MECHANISM
Filed Jan. 27, 1940  28 Sheets-Sheet 22

INVENTOR
ARTHUR G. RINDFLEISCH
BY *O. A. Spark*
ATTORNEY

July 25, 1944.  A. G. RINDFLEISCH  2,354,549
CARD CONTROLLED MECHANISM
Filed Jan. 27, 1940  28 Sheets-Sheet 23
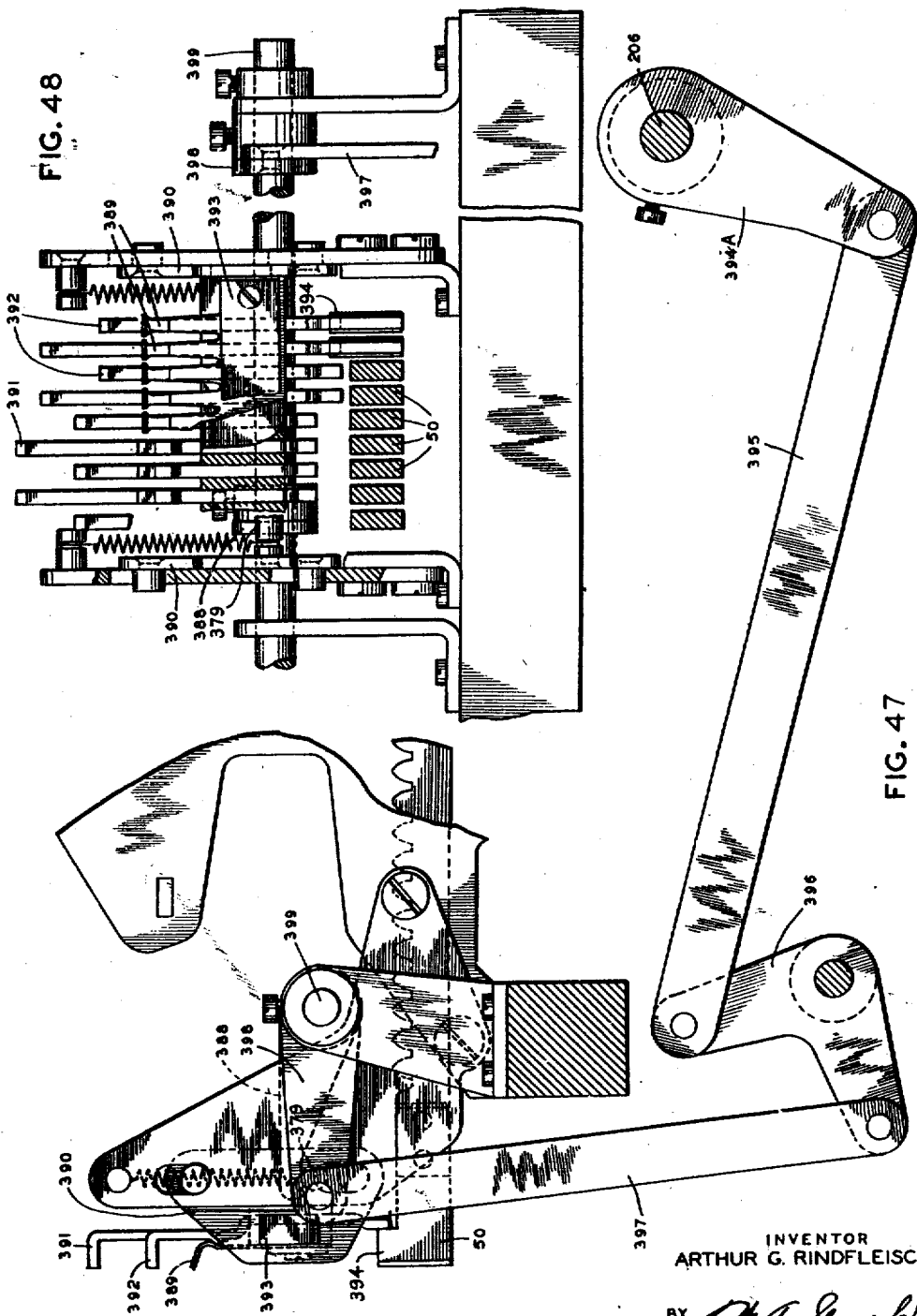
INVENTOR
ARTHUR G. RINDFLEISCH
BY
ATTORNEY July 25, 1944.     A. G. RINDFLEISCH     2,354,549
CARD CONTROLLED MECHANISM
Filed Jan. 27, 1940     28 Sheets-Sheet 24

| MINOR FIELD | | MAJOR FIELD |
|---|---|---|
| EMPLOYEE DESIGNATION | DEP'T DESIGNATION | |
| ADDS IN REAR ACCUMULATOR    1 2 3 | 1 67 | ADDS IN REAR ACCUMULATOR |
| NON-ADDS IN REAR ACCUMULATOR 1 2 3 | 1 67 | NON-ADDS IN REAR ACCUMULATOR |
| "    "    "    "    "         1 2 3 | 1 67 | "    "    "    "    " |
| TOTAL PUNCH & TRANSFER  1 2 3 | 1 67 | TOTAL PUNCH & TRANSFER |
| ADDS IN REAR ACCUMULATOR    1 2 4 | 1 67 | ADDS IN REAR ACCUMULATOR |
| NON-ADDS IN REAR ACCUMULATOR 1 2 4 | 1 67 | NON-ADDS IN REAR ACCUMULATOR |
| "    "    "    "    "         1 2 4 | 1 67 | "    "    "    "    " |
| "    "    "    "    "         1 2 4 | 1 67 | "    "    "    "    " |
| TOTAL PUNCH & NON-TRANSFER  1 2 4 | 1 67 | TOTAL PUNCH & NON-TRANSFER |
| BLOCKED GRAND TOTAL       —(1 2 3) | 1 67 | GRAND TOTAL CLEAR-PUNCH |
| ADDS IN REAR ACCUMULATOR    1 2 5 | 1 68 | ADDS IN REAR ACCUMULATOR |
| NON-ADDS IN REAR ACCUMULATOR 1 2 5 | 1 68 | NON-ADDS IN REAR ACCUMULATOR |
| "    "    "    "    "         1 2 5 | 1 68 | "    "    "    "    " |
| TOTAL PUNCH & TRANSFER  1 2 5 | 1 68 | TOTAL PUNCH & TRANSFER |
| GRAND TOTAL BLOCKED       —(2 4 8) | 1 68 | GRAND TOTAL CLEAR-PUNCH |

FIG. 49

INVENTOR
ARTHUR G. RINDFLEISCH
BY *W. A. Spaeth*
ATTORNEY

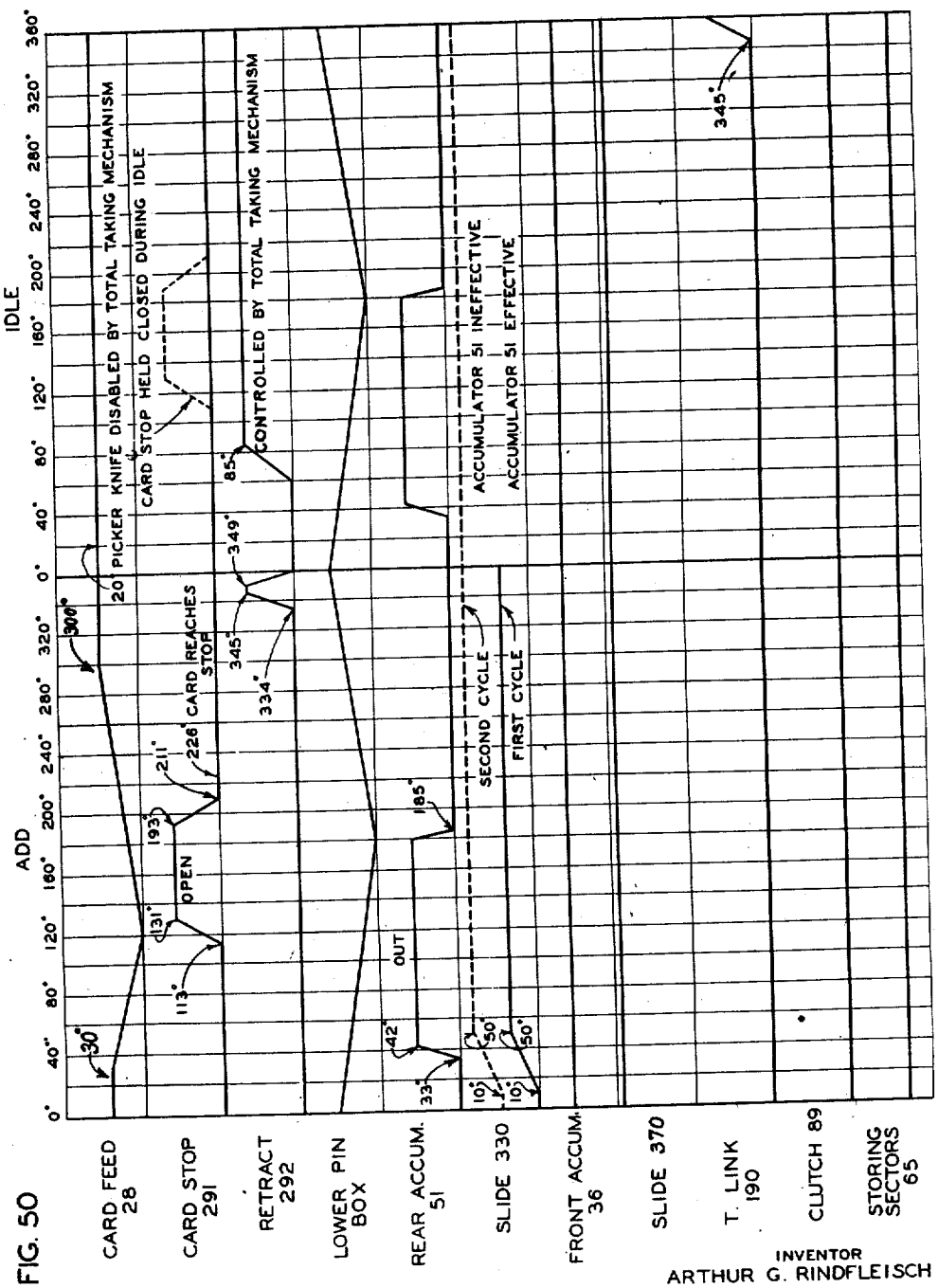

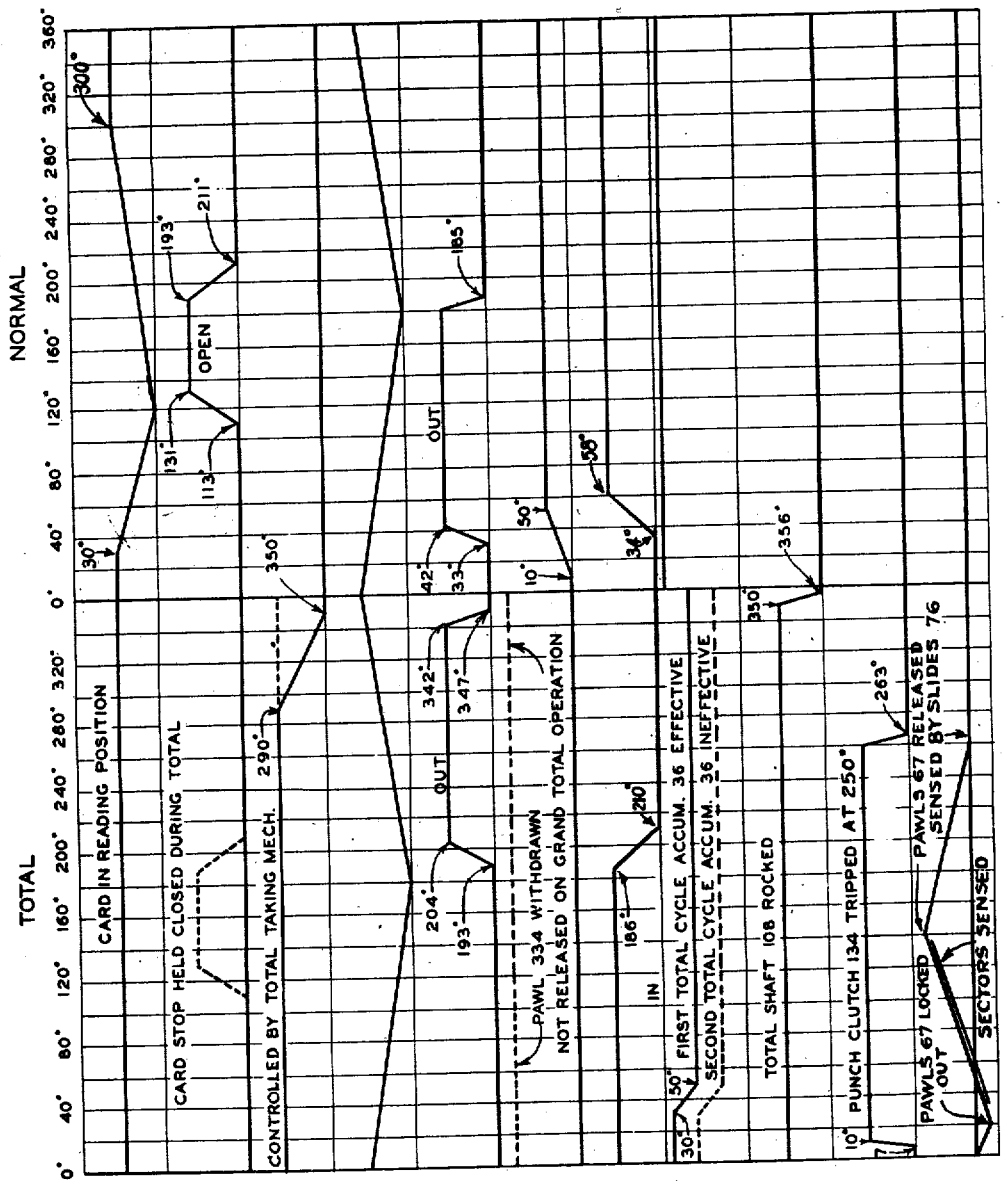

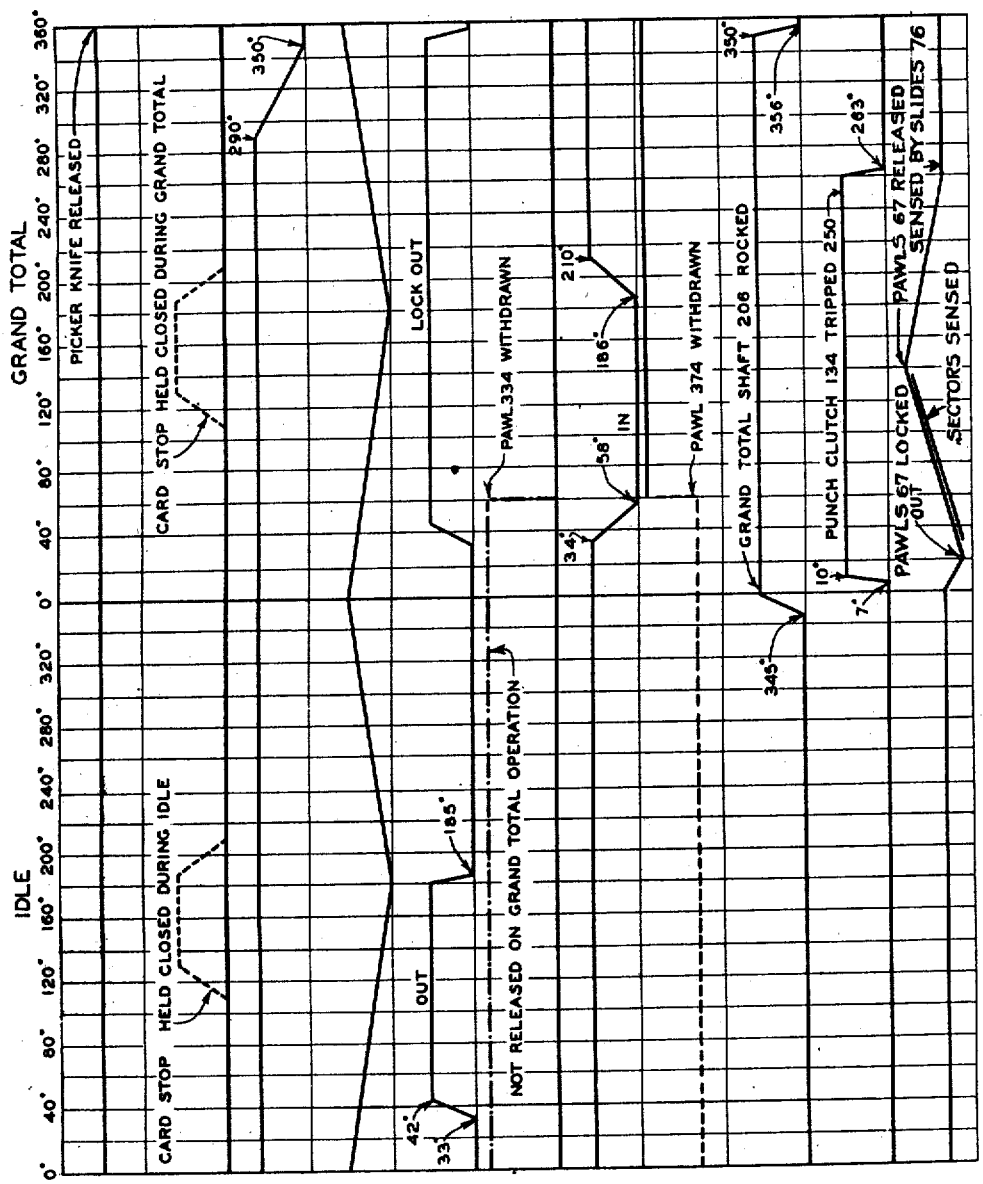

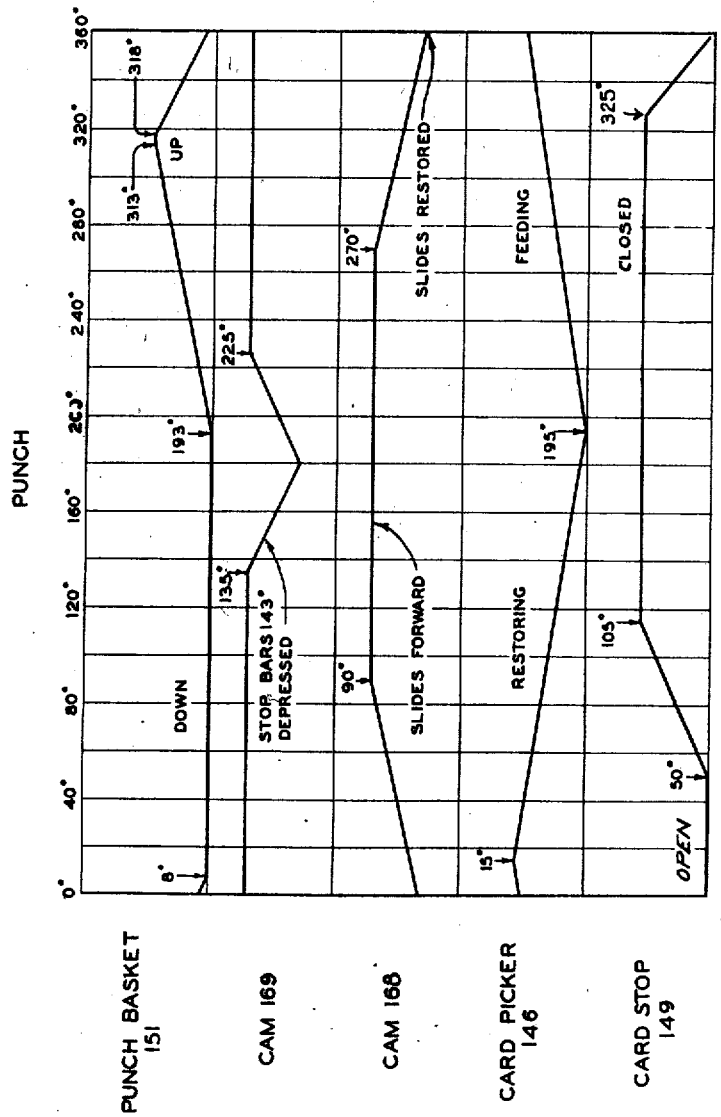

Patented July 25, 1944

2,354,549

UNITED STATES PATENT OFFICE 2,354,549

CARD CONTROLLED MECHANISM

Arthur G. Rindfleisch, Cincinnati, Ohio, assignor to Remington Rand Inc., Buffalo, N. Y., a corporation of Delaware Application January 27, 1940, Serial No. 315,916

3 Claims. (Cl. 235—61.10)

This invention relates generally to tabulators capable of transferring total designations to a summary punch and particularly to a direct subtraction tabulator capable of transferring group total designations and grand total designations to a summary punch, and is a continuation in part of my application S. N. 143,256, filed May 18, 1937, for Card controlled mechanism.

In the prior art, tabulators have been capable of transferring group total designations to a summary punch. But such tabulators have been of the type provided only with group total mechanism. An example of such a tabulator is disclosed in U. S. Patent No. 1,998,281, granted to Kuhlman and Becker.

But heretofore the improved Powers direct subtraction tabulator having group total and grand total mechanism has not been capable of transferring total designations and grand total designations to a summary punch.

To enable a tabulator of the direct subtraction type to transfer total and grand total designations to a summary punch, a number of modifications must be made in the tabulator. The modifications required may be readily understood from a consideration of the functions of a tabulator of this type.

A direct subtraction tabulator is disclosed in the patent to W. W. Lasker, No. 2,124,177, issued July 19, 1938. The tabulator of the patent is provided with seven computing units, each of which has a rear or total accumulator and a front or grand total accumulator. The rear accumulators are conditioned to add during tabulating cycles while the front accumulators are conditioned to non-add during tabulating cycles. During group total operations of the tabulator, the rear accumulators are conditioned for totaltaking with clearing and the front accumulators are conditioned to add. Accordingly, group totals taken from the rear accumulators during total operations are transferred to the front accumulators. During grand total operations of the tabulator, the rear accumulators are conditioned to non-add while the front accumulators are conditioned for total taking with clearing. Accordingly, during grand total operations, a grand total with clearing is taken from the front accumulators while the rear accumulators are unaffected during this operation.

Let it be assumed that a direct subtraction tabulator having the above enumerated functions is combined with a summary punch and that during group total operations of the tabulator, the group totals taken from the rear accumulators of the tabulator are transferred to the summary punch as well as to the front accumulators of the tabulator, while during grand total operations of the tabulator, the grand totals taken from the front accumulators of the tabulator are transferred to the summary punch. It is to be understood that totals transferred to the summary punch are perforated by the punch in a summary card.

The operation of the tabulator when combined with a summary punch may best be considered in connection with a particular accounting problem. In the cost finding operations of a factory, it may become desirable to find the total hours worked during a particular period by each of the employees in two departments and the total hours worked by the employees in each department. The required information may be obtained by tabulating the perforated cards of the employees of the two departments for the period in question. Let it be assumed that the cards for these employees for this period are as follows:

| Department designation | Employee designation | Hours worked |
|---|---|---|
| 167 | 123 | 40 |
| 167 | 123 | 40 |
| 167 | 123 | 40 |
| 167 | 124 | 35 |
| 167 | 124 | 35 |
| 167 | 124 | 35 |
| 167 | 124 | 35 |
| 168 | 125 | 40 |
| 168 | 125 | 40 |
| 168 | 125 | 30 |

To obtain the required information and to obtain summary cards containing this information, the tabulator is set in a well known manner to effect a group total operation upon a change in employee designation and to effect a grand total operation upon a change in department designation. It may be assumed that the department and employee designations are entered into computing unit #1 which is split for this purpose, and the hours worked are entered into computing unit #2. Computing unit #1, into which the designations are entered, may be called the designating unit, and computing unit #2, into which the hours worked are entered, may be called the accumulating unit.

The three groups of cards are then run through the tabulator, the cards of employees 123, 124 and 125 being sensed in the order just given. It will be remembered that the rear accumulator of computing units #1 and #2, which are the only units that need be considered here, are conditioned to add during tabulating cycles. Accordingly, as the three cards of employee 123 are sensed, the designations on these cards are accumulated by the rear accumulator of the designating unit #1 and the hours worked on these cards are accumulated by the rear accumulator of the accumulating unit #2. After the three cards of employee 123 have been accumulated, the condition of units #1 and #2 is as follows:

| Designating unit #1 | | | Accumulating unit #2 | |
|---|---|---|---|---|
| Front accumulator | Rear accumulator | | Front accumulator | Rear accumulator, hours worked |
| | Dept. designation | Employee designation | | |
| 0 | 501 (3×167) | 369 (3×123) | 0 | 120 |

It is, therefore, evident that the department and the employee designations for the three cards of employee 123 have been improperly accumulated in the rear accumulator of the designating unit #1.

To avoid this result, the computing unit of the standard Powers direct subtraction tabulator utilized as a designating unit when the tabulator is combined with a summary punch, in the present instance unit #1, must be modified to permit the designations appearing on the first card of each group to be entered into the rear accumulator of the unit and to prevent the entry into the rear accumulator of the designations from the remaining cards of the same group.

When the proper unit, or unit #1, in the present instance, is modified in this manner, the designations on the first card of employee 123 are entered into the rear accumulator of the designating unit #1 and the hours worked appearing on each card of this group is entered into accumulating unit #2. After the three cards of employee 123 have been tabulated, the condition of designating unit #1 and accumulating unit #2 is as follows:

| Designating unit #1 | | | Accumulating unit #2 | |
|---|---|---|---|---|
| Front accumulator | Rear accumulator | | Front accumulator | Rear accumulator, hours worked |
| | Dept. designation | Employee designation | | |
| 0 | 167 | 123 | 0 | 120 |

Then upon the occurrence of a group total operation initiated by the sensing of the first card of employee 124, a total of the amounts standing in the rear accumulator of units #1 and #2 is taken, after which the rear accumulators remain cleared, and these totals are transferred to the front accumulators of these units and to the summary punch where they are perforated in a group total summary card. The summary card punched contains the department designation 167, the employee designation 123, and the total hours worked by employee 123, namely, 120.

The standard Powers direct subtraction tabulator is provided with known mechanism for causing group total designations to be printed from the first card of a group, with means for suppressing the printing of total designations from subsequent cards of a group and for suppressing the printing of total designations during group total operations. The mechanism mentioned also prevents the operation of the line space mechanism except after totals and grand total operations. It will, therefore, be evident that the designating unit #1 will permit the designations sensed from the first card of employee 123 to be printed on the record sheet during the cycle in which this card is tabulated, while during the first total operation the total hours worked by employee 123, namely, 120, will be printed on the same line of the record sheet as the previously printed designations 167 and 123. After the total operation, the line space mechanism operates to space the record sheet to permit printing of the designations from the first card of employee 124 when that card is tabulated.

The condition of units #1 and #2 at the end of the first group total operation is as follows:

| Designating unit #1 | | | Accumulating unit #2 | |
|---|---|---|---|---|
| Front accumulator | | Rear accumulator | Front accumulator, hours worked | Rear accumulator |
| Dept. designation | Employee designation | | | |
| 167 | 123 | 0 | 120 | 0 |

After the first total operation has been completed, tabulation is resumed and the four cards of employee 124 are tabulated. Assuming that the designating unit of the tabulator is modified in the manner indicated above, the department designation 167 and the employee designation 124 from the first card only of this group are entered into the rear accumulator of the designating unit #1 but the hours worked appearing on each card of the group is entered into the rear accumulator of accumulating unit #2. When the four cards of employee 124 have been tabulated, the condition of units #1 and #2 is as follows:

| Designating unit #1 | | | | Accumulating unit #2 | |
|---|---|---|---|---|---|
| Front accumulator | | Rear accumulator | | Front accumulator, hours worked | Rear accumulator, hours worked |
| Dept. designation | Employee designation | Dept. designation | Employee designation | | |
| 167 | 123 | 167 | 124 | 120 | 140 |

After the tabulation of the four cards of employee 124, the first card of employee 125 is sensed, causing a change of department designation and initiating a grand total operation. As is well understood in the art, the initiation of a grand total operation on the standard Powers direct subtraction tabulator causes a total operation followed by a grand total operation.

It will be remembered that in the standard Powers direct subtraction tabulator, the initiation of each total operation effects the transfer of the total taken from the rear accumulator of any unit to the front accumulator of the same unit. But in the present instance, to transfer the department designation 167 and the employee designation 124 to the front accumulator of the designating unit #1 upon the occurrence of the second group total operation would leave a department designation of 334 (167+167) and an employee designation of 247 (123+124) standing in the front accumulator of this unit at the end of this group total operation. As will appear later, this would result in the printing and punching of an improper grand total or department designation during the grand total operation.

To avoid this undesirable result, the standard Powers direct subtraction tabulator is modified so that the transfer of the grand total or department designation from the rear to the front accumulator of the designation unit #1 is prevented during each group total operation subsequent to the first such operation following a grand total cycle. The transfer of the total or employee designation is also prevented at the same time. This is done, as will appear later, because the transfer preventing means acts upon the entire front accumulator of the designating unit #1 even though that accumulator is split to permit one portion to receive the department designation and the other portion to receive the employee designation.

It may be observed that though the transfer of the grand total and total designations from the rear to the front accumulator of the designating unit is prevented during the second total operation, the designations from the first card of employee 124 are printed on the record sheet during the cycle in which that card is tabulated, while the total number of hours worked by employee 124 is printed on the same line of the record sheet as the designations during the second total operation. Likewise, the designations standing in the rear accumulator of the designating unit #1 and the total hours worked by employee 124, standing in the rear accumulator of accumulating unit #2, are transferred to the summary punch during the second total operation.

From the table of the computing units #1 and #2 after the four cards of employee 124 have been tabulated, it is evident that during the second group total operation, a total summary card is punched containing the following data:

Dept. designation | Employee designation | Hours worked
167 | 124 | 140

Following the second group total operation, the condition of units #1 and #2 is as follows:

| Designating unit #1 | | Accumulating unit #2 | |
|---|---|---|---|
| Front accumulator | Rear accumulator | Front accumulator, hours worked | Rear accumulator |
| Dept. designation | Employee designation | | |
| 167 | 123 | 0 | 260 | 0 |

The standard Powers direct subtraction tabulator is provided with known means for suppressing the printing of designations from the grand total accumulator of the designating unit #1 during grand total operations. These means are rendered ineffective before the tabulator is started so that both grand total or department designations and total or employee designation standing in the front accumulator of the designating unit #1 would tend to be printed during grand total operations in the standard tabulator. But during the grand total operation following the second total operation, it is obviously undesirable to print the employee designation 123 standing in the front accumulator or to punch this designation in the grand total summary card prepared by the punch during the grand total operation. Accordingly, the standard Powers direct subtraction tabulator is further modified to prevent the printing and punching of the employee designation standing in the front accumulator of the designating unit #1 during a grand total operation. Thus, during the grand total operation under consideration, a grand total summary card is punched containing the department designation 167 and the total hours worked by the employees of department 167, namely, 260. It is to be noted that at the end of this grand total cycle, the front and rear accumulators of units #1 and #2 are in cleared condition and that the machine is ready to tabulate the employees' cards of the next department and to prepare additional summary cards. It is to be understood that the department numbers are to be considered as "major" designations and the employee numbers as "minor" designations hereinafter wherever referred to.

From the foregoing explanation, the operation of the machine in punching a total summary card for employee 125 and a grand total summary card for department 168 will be readily understood. The total summary card will contain the department designation 168, the employee designation 125, and the total hours worked by employee 125, namely, 110. The grand total summary card will contain the department designation 168, and the total number of hours worked in this department, or 110.

It is, therefore, an object of the present invention to enable one of the computing units of a standard direct subtraction tabulator to be utilized for transferring group total designations and grand total designations to a summary punch.

It is another object to permit selection of the group designation field, in the present instance, the employee designation field.

It is an additional object to condition the rear or total accumulator of the designating unit to non-add the designations on the cards of a group subsequent to the first card in the group.

It is a further object to prevent transfer of designations from the rear to the front or grand total accumulator of the designating unit during group total operations subsequent to the first such operation following a grand total operation.

It is another object to restore the rear or total accumulator of the designating unit to add condition after a group total operation and after a grand total operation.

It is an additional object to recondition the front or grand total accumulator of the designating unit to receive a transfer from the rear accumulator of the same unit during the group total operation following a grand total operation.

It is a further object to block out the amounts standing in the employee field of the grand total accumulator of the designating unit.

It is another object to render the designating unit optionally effective to transfer group total and grand total designations to a summary punch.

Other objects of the invention will appear when the following detailed description is read in connection with the accompanying drawings, wherein Fig. 1 is a side elevation of a tabulator and summary punch in operative relation;

Figs. 2, 3, and 4, combined as in Fig. 2A, constitute an elevation in section of the tabulator head section (Fig. 2), base section (Fig. 3) and the punch setting mechanism (Fig. 4);

Figs. 5 and 6 combined form a schematic cross section through the main operating mechanisms of the tabulator and summary punch;

Figs. 6A, 6B, 6C, and 6D are a series of schematic views showing the relative positions of certain of the elements of Fig. 6 during different punching operations;

Fig. 7 is a schematic diagram of the total taking and accumulating mechanism of the tabulator;

Fig. 8 is a detail of the control mechanism for the front accumulator;

Fig. 9 is a detail of the control mechanism for the rear accumulator;

Fig. 10 is a detail position view of the step sector released for sensing;

Fig. 11 is a detail position view of the step sector in sensing position and the latch being set;

Fig. 12 is a detail position view of the step sector in position to be sensed by the punch mechanism;

Fig. 13 is a left-hand side elevation view of the machine disclosing the punch control mechanism;

Figure 2:
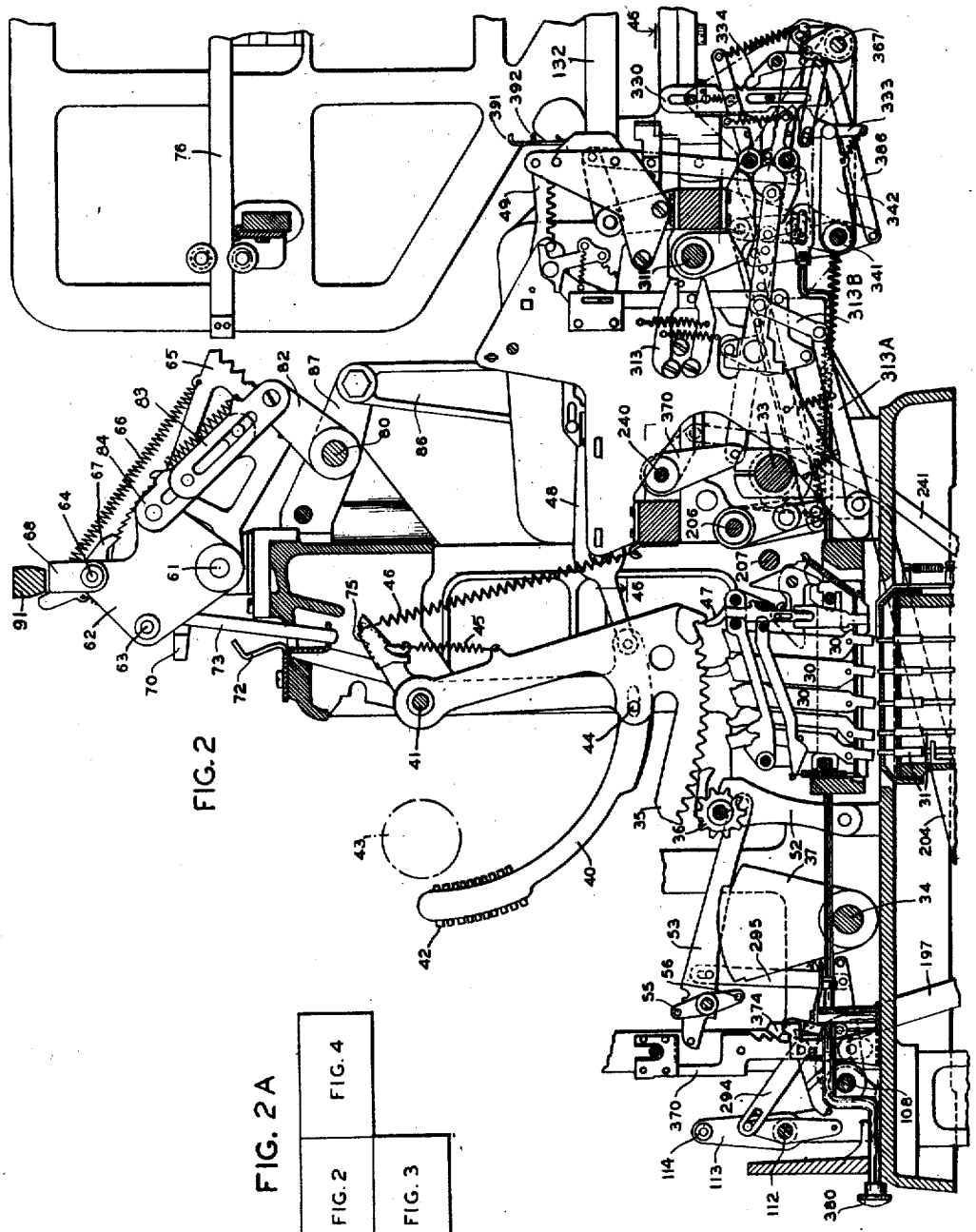
Figure 24:
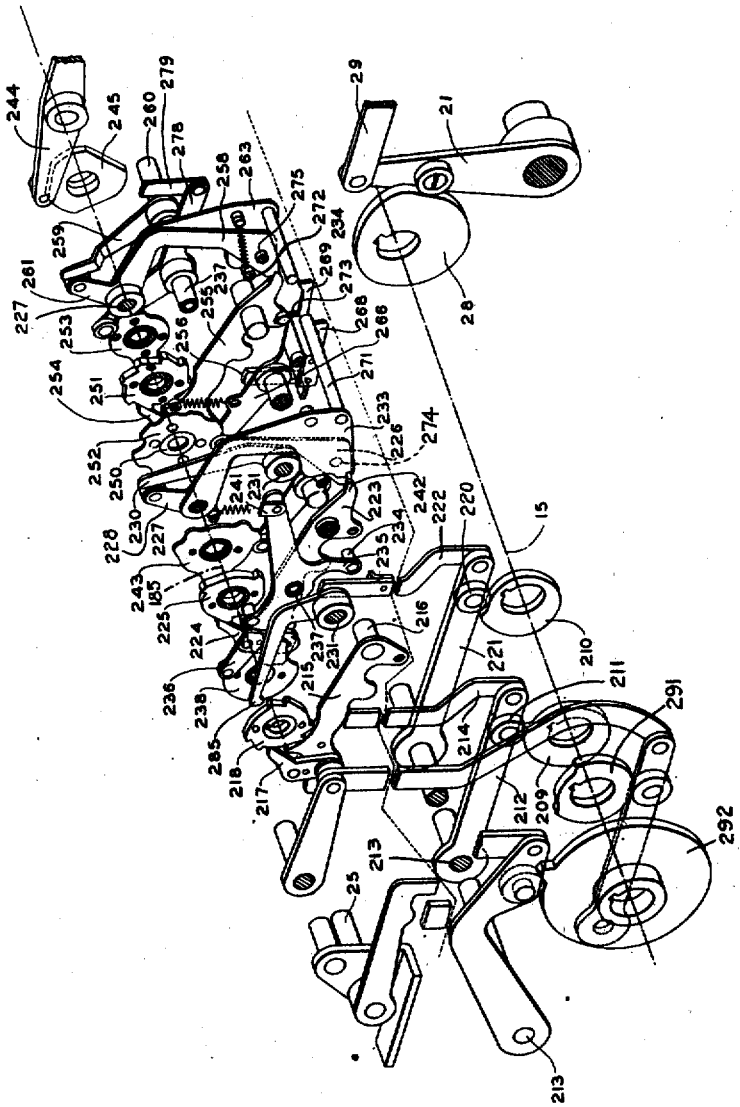
Figure 25:
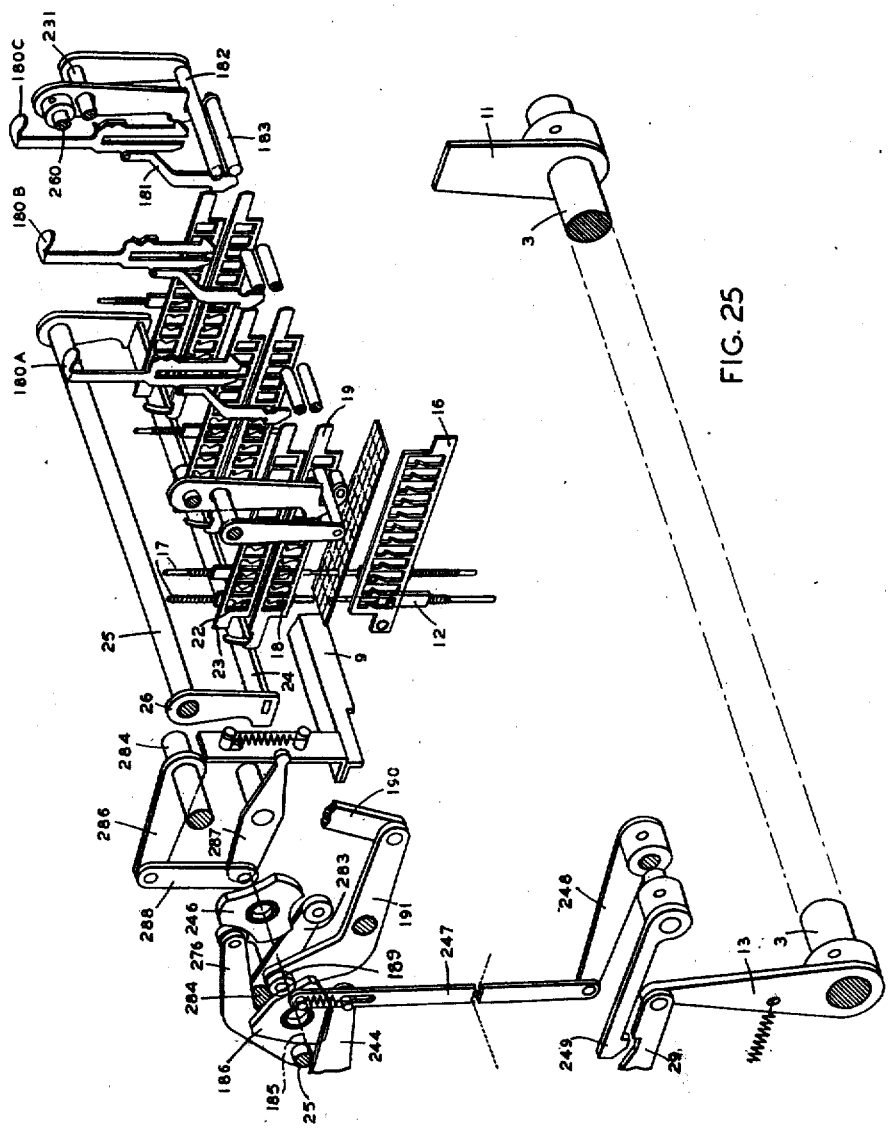
Figure 26:
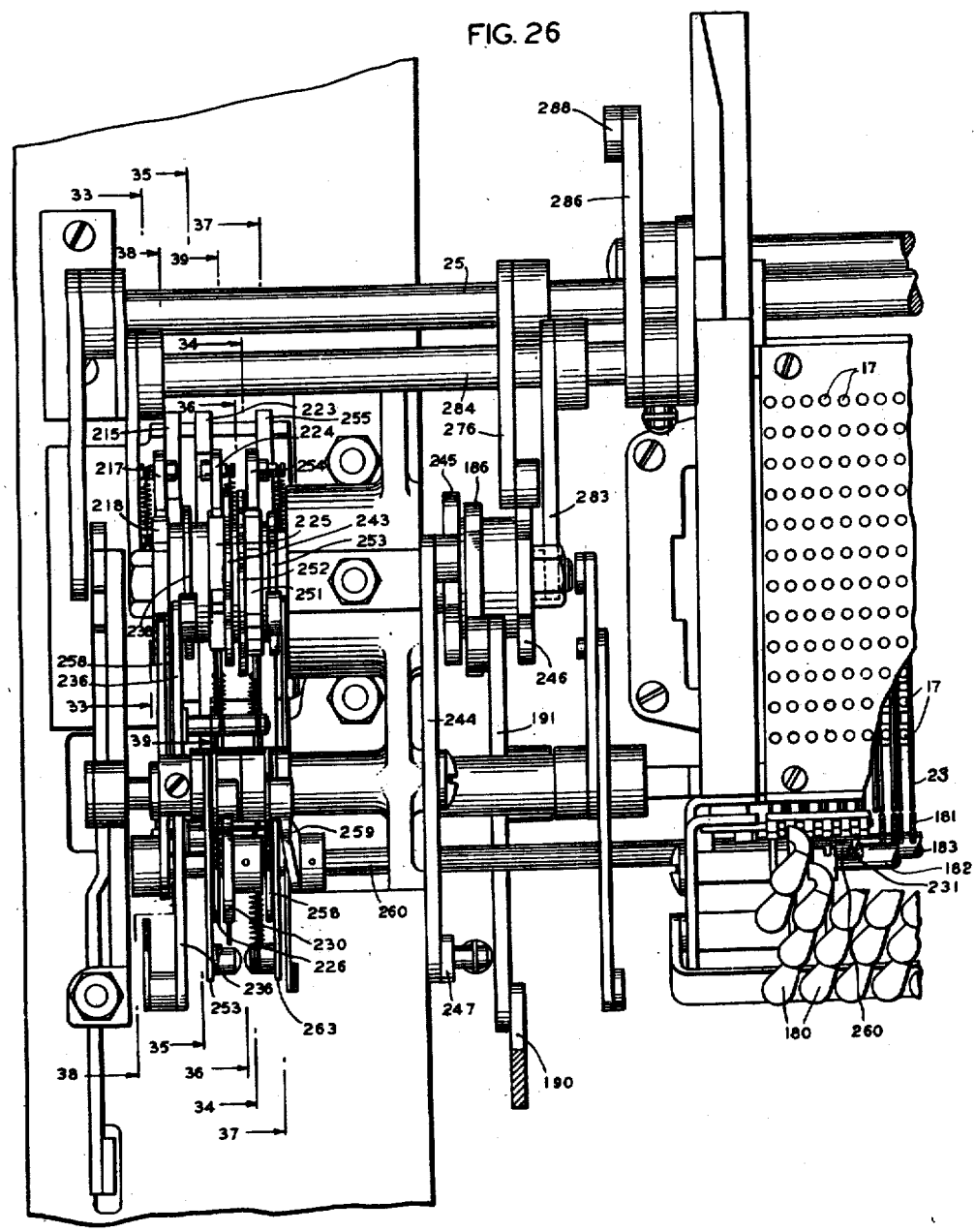
Figure 27:
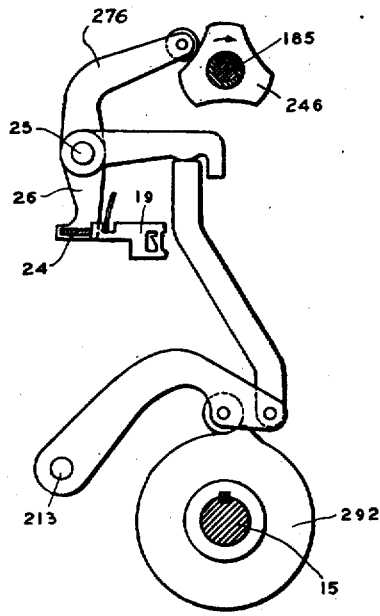
Figure 28:
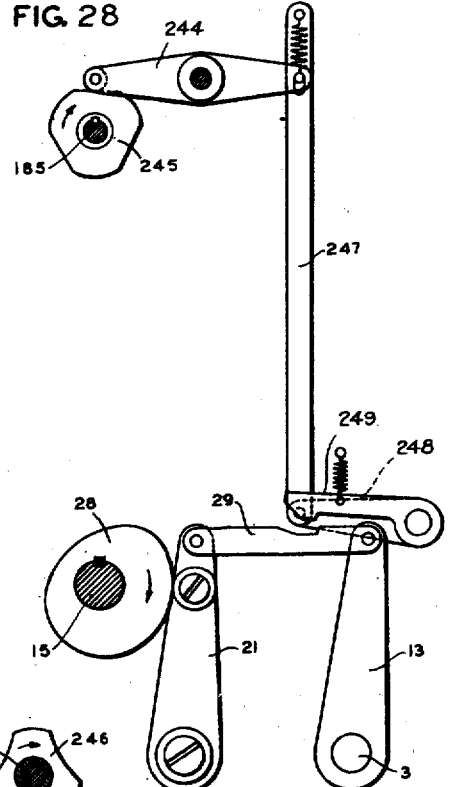
Figure 29:
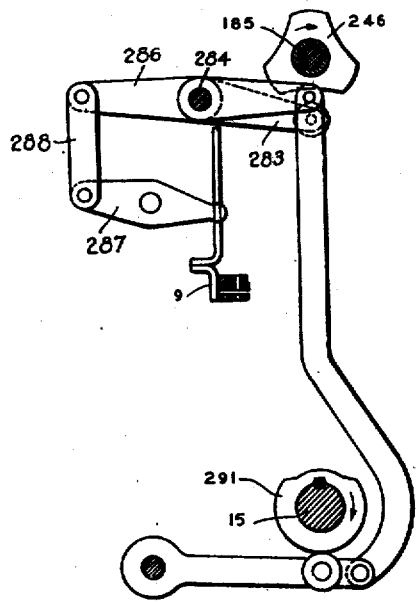
Figure 30:
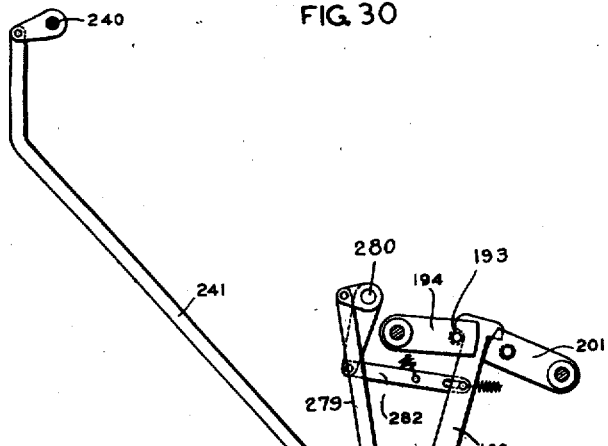
Figure 31:
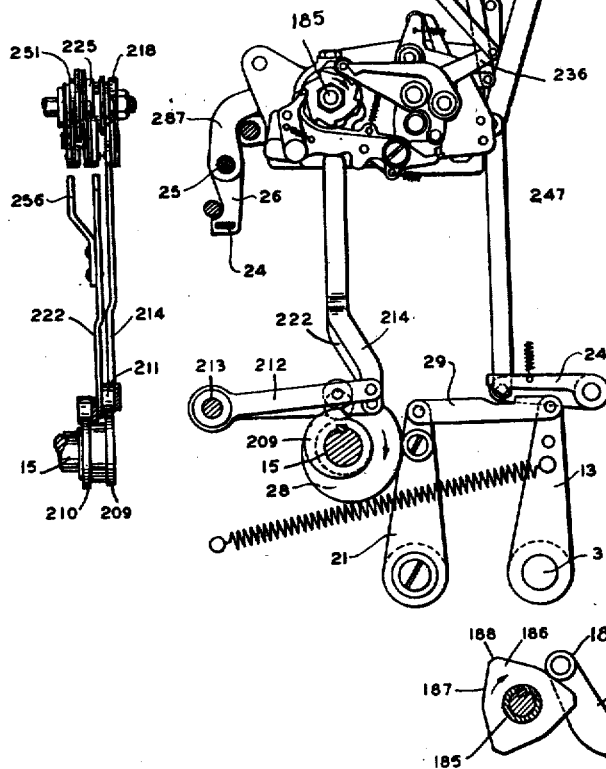
Figure 32:
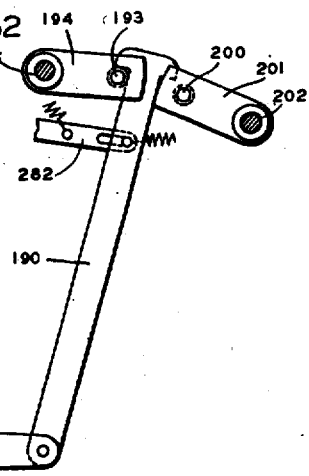
Figure 33:
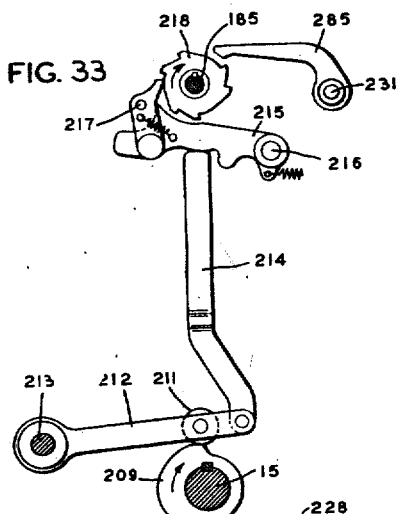
Figure 34:
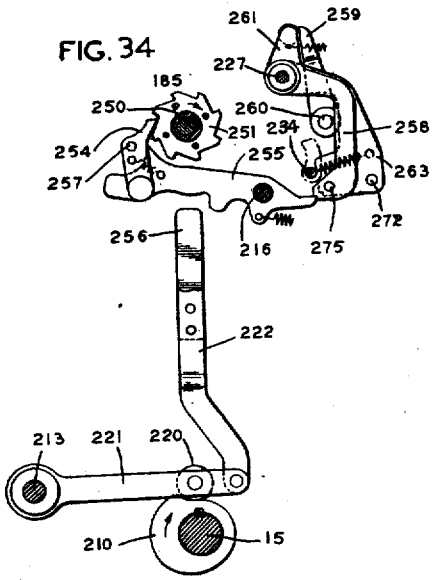
Figure 35:
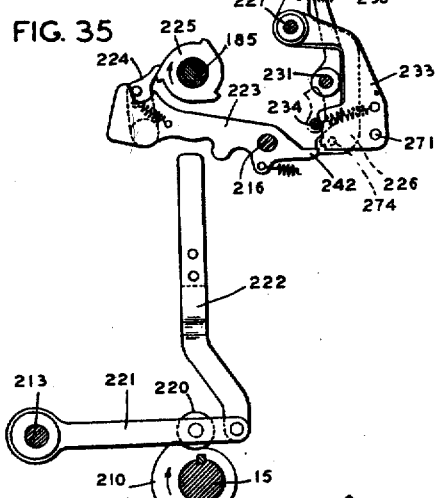
Figure 36:
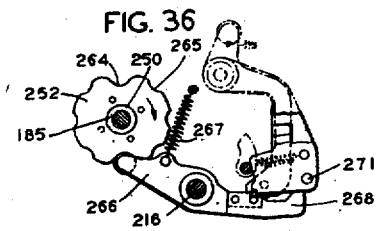
Figure 37:
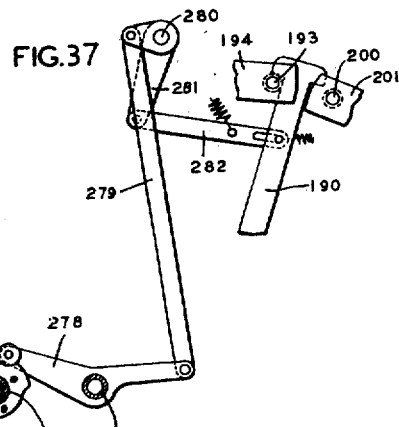
Figure 40:
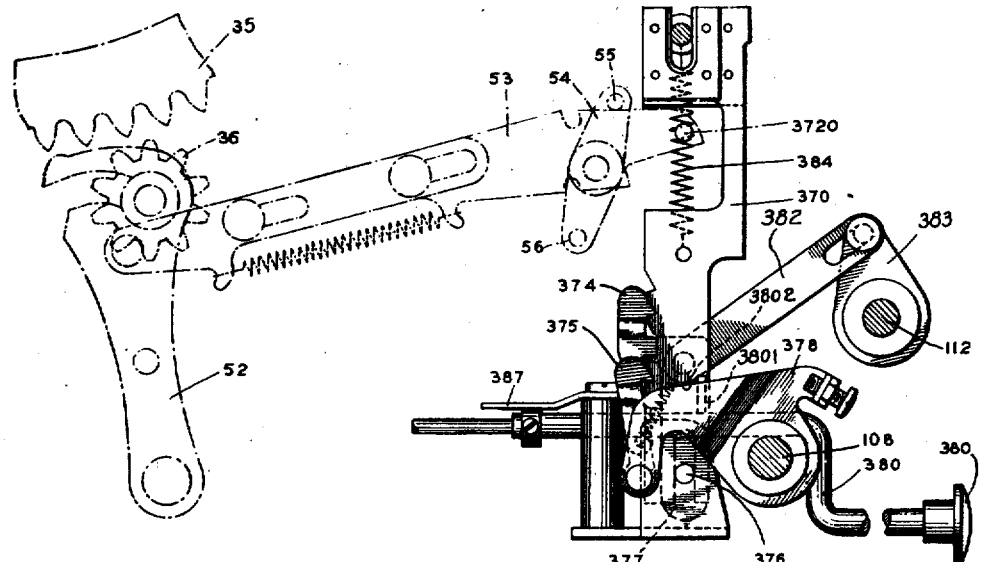
Figure 41:
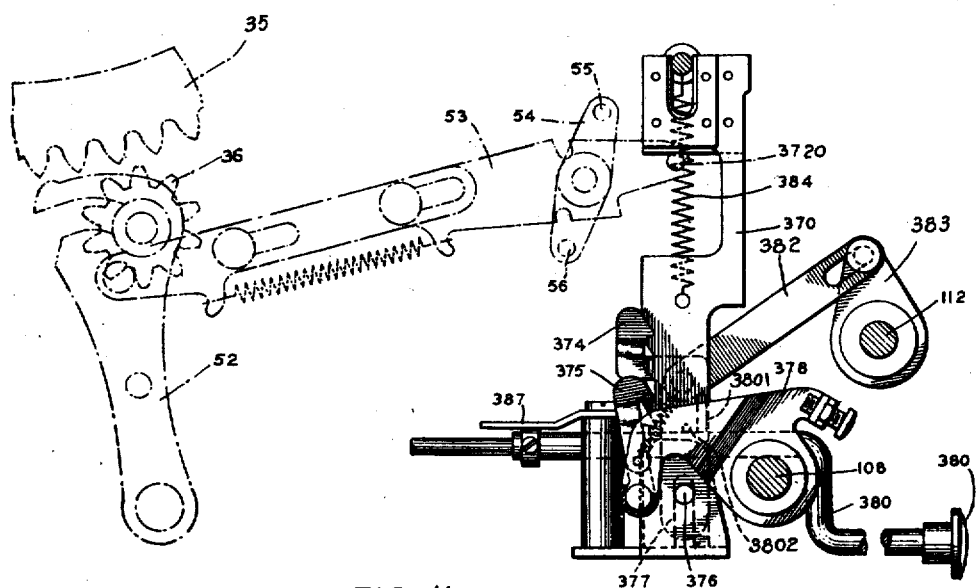
Figure 42:
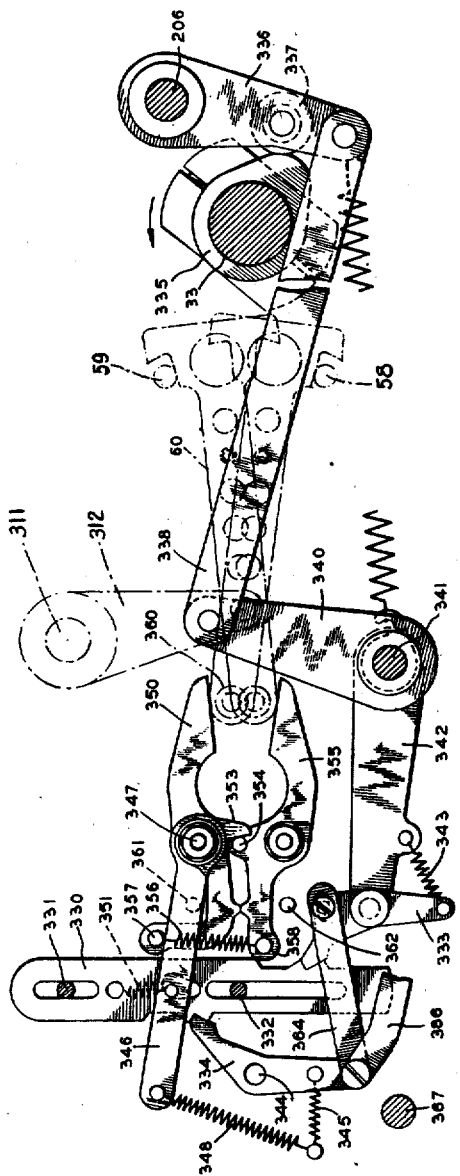
Figure 43:
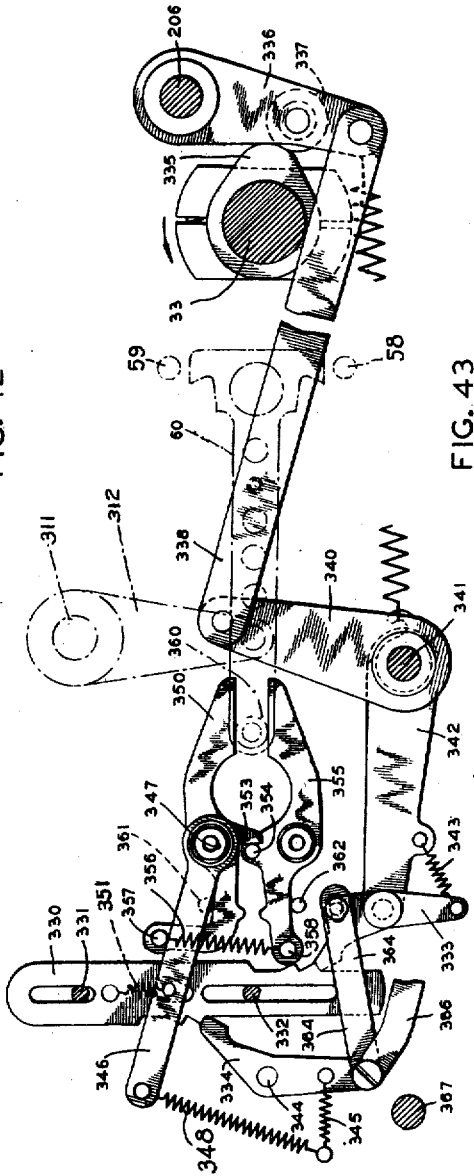
Figure 46:
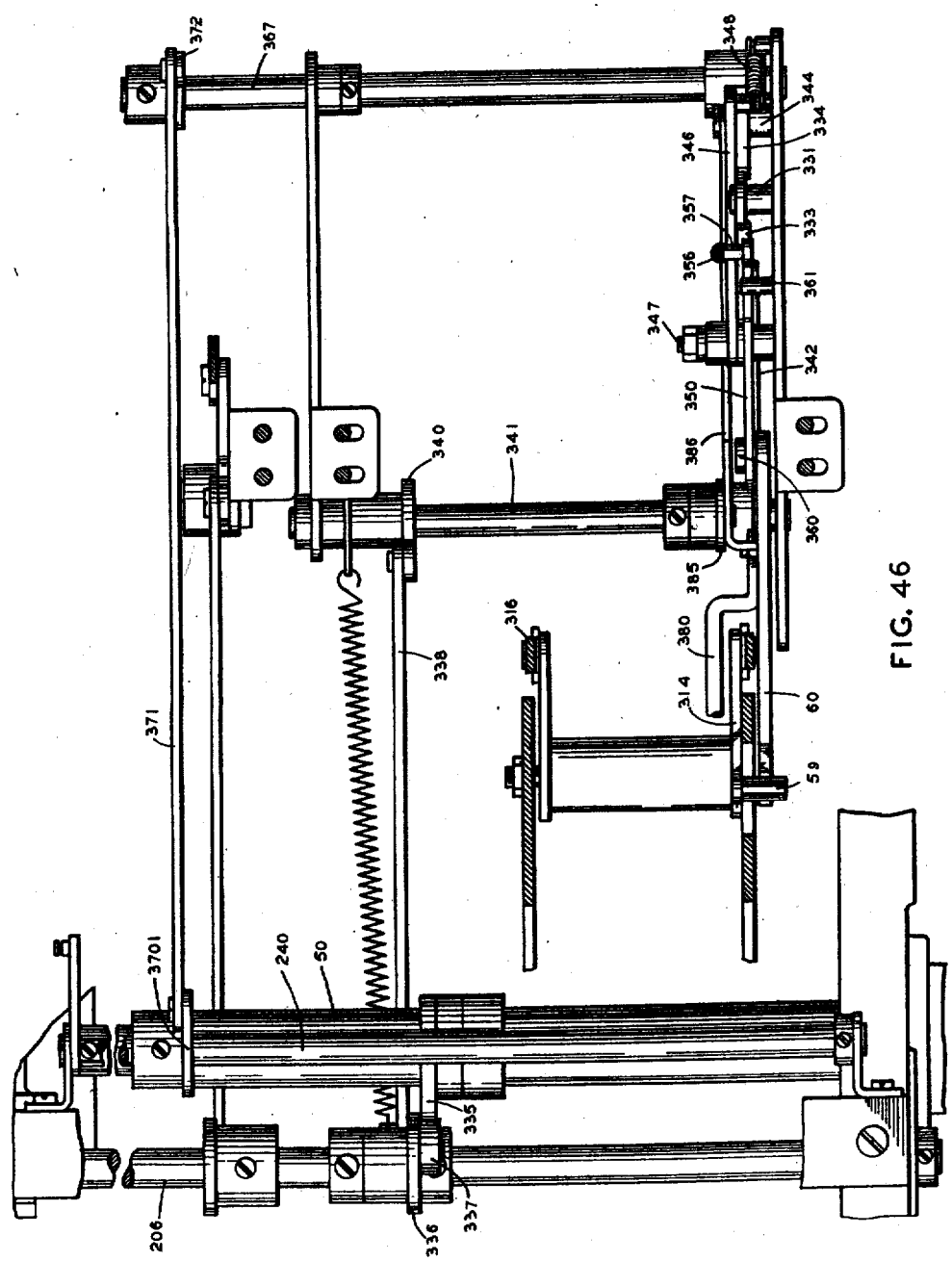

Figs. 24 and 25 disclose the total taking control mechanism in exploded isometric;

Fig. 26 is a plan view of total taking control mechanism;

Fig. 27 is a detail view of the retract cam and associated linkage;

Fig. 28 is a detail view of the card feed disabling cam and associated linkage;

Fig. 29 is a detail view of the card stop cam and associated linkage;

Fig. 30 is a detail view of the side elevation of the total taking control mechanism and associated linkage;

Fig. 31 is a side elevation of a portion of Fig. 30;

Fig. 32 is a detail of the T link operating cam and associated linkage;

Figs. 33-39, inclusive, disclose the cams and associated parts which comprise the total taking control mechanism;

Fig. 40 is a detail view of the non-add device for the front or grand total accumulator in normal position;

Fig. 41 is a detail view similar to Fig. 40 in position to cause non-adding in the grand total accumulator;

Fig. 42 is a detail position view of the non-add control mechanism for the rear or total accumulator in normal position;

Fig. 43 is a detail position view of Fig. 42 with the parts in the non-add position;

Fig. 44 is a detail view disclosing the interconnecting mechanism between the front and rear non-add devices in ineffective position;

Fig. 45 is a detail view similar to Fig. 44 with the devices in effective position;

Fig. 46 is a partial plan view of the mechanism of the present invention taken on the line 46—46 of Fig. 2;

Fig. 47 is a detail elevation of the rear designation setting mechanism;

Fig. 48 is a rear elevation of the mechanism of Fig. 47;

Fig. 49 is a chart disclosing the successive steps in the compilation of a report;

Figs. 50, 51, and 52 comprise a timing diagram of the tabulator operation; and

Fig. 53 is a timing diagram of the punch operation.

Figure 1:
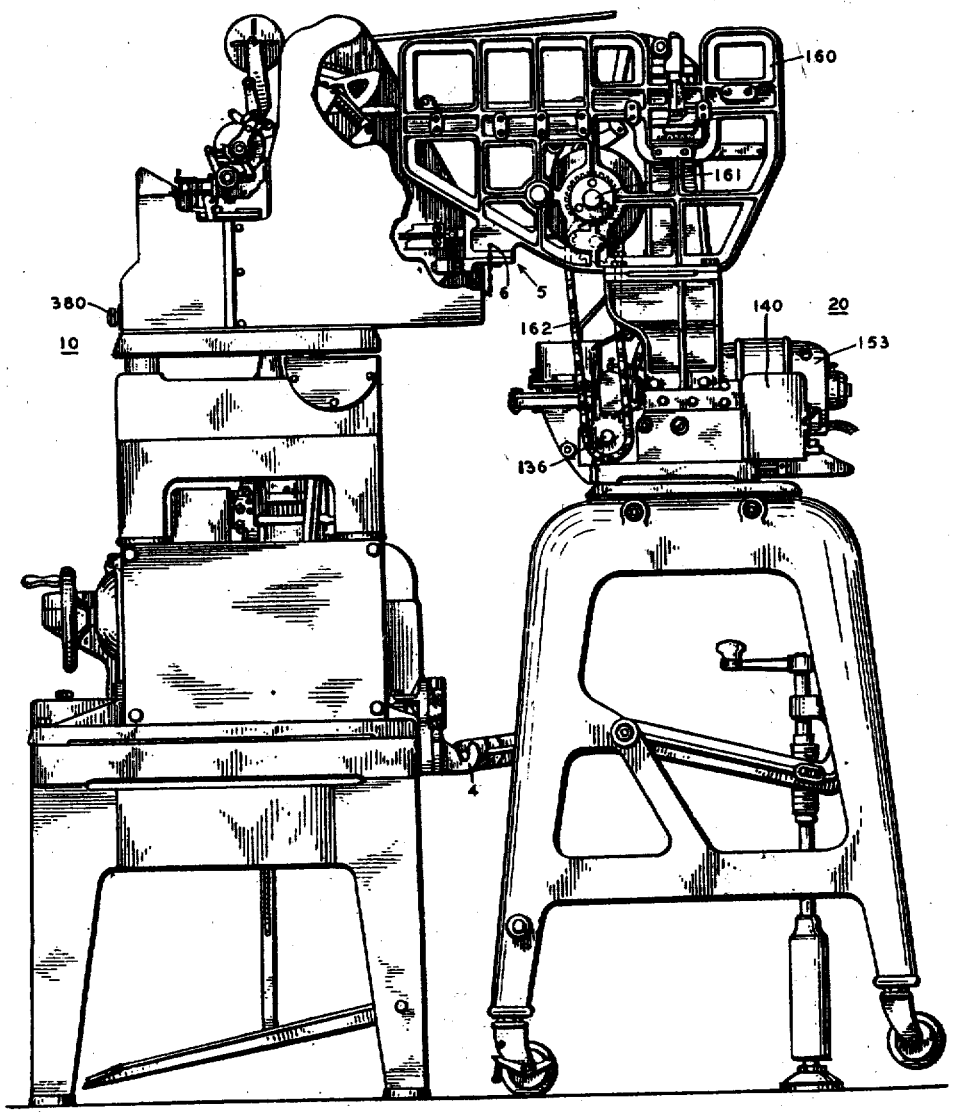

A standard Powers direct subtraction tabulator combined with a summary punch is illustrated in Fig. 1. This tabulator is well known in the art and is disclosed in detail in the previously mentioned U. S. patent to Lasker 2,124,177. The summary punch is also well known in the art and is disclosed in detail in the U. S. patent to Kuhlman et al. No. 1,998,281, previously referred to. As the machine to which the present invention is applied is, therefore, well known in the art, it is disclosed and described in no more detail than is necessary to afford an understanding of the present invention.

A brief description will be given of the standard Powers direct subtraction tabulator insofar as an understanding of its mechanism is necessary to an understanding of the present invention.

Figure 3:
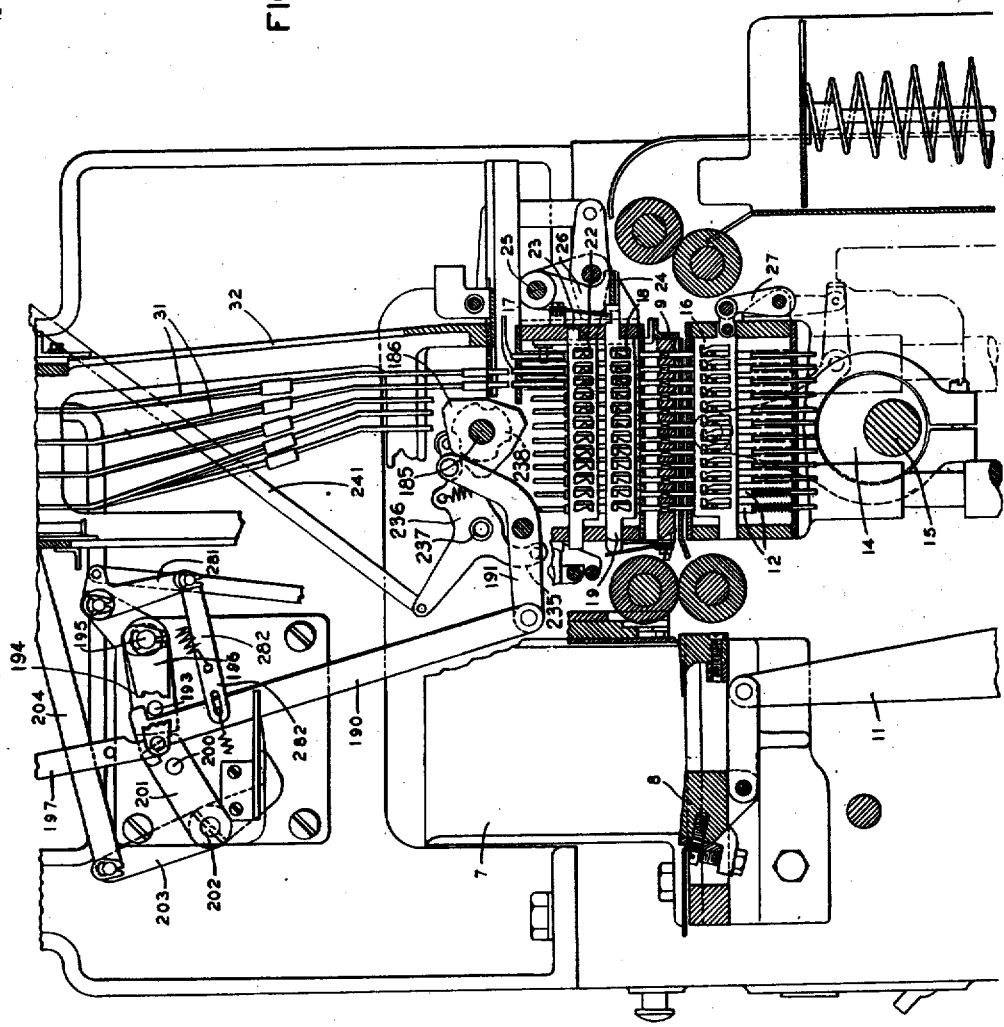
Figure 5:
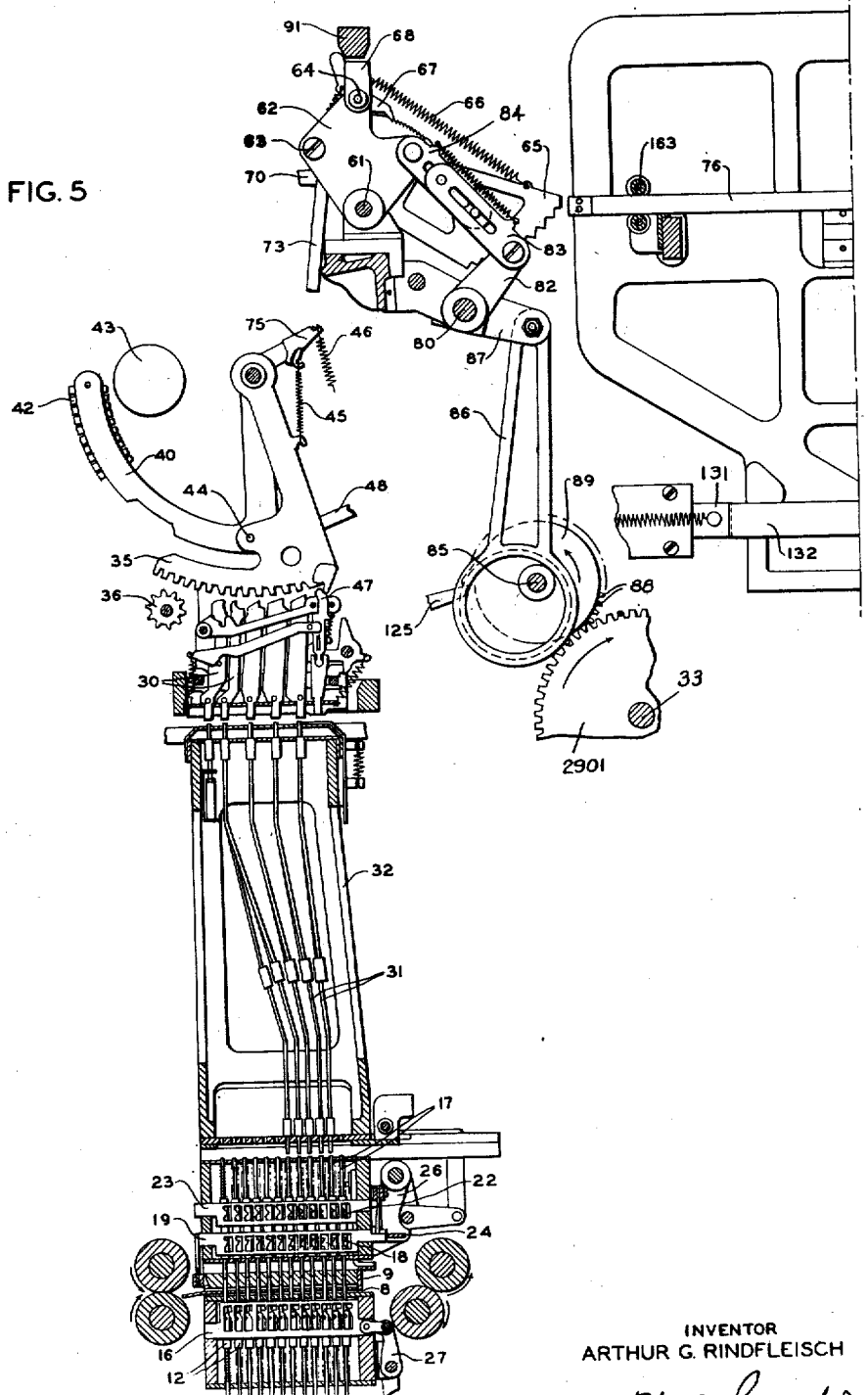

As shown schematically in Figs. 5 and 6 and in detail in Figs. 1, 2, and 3, the tabulating mechanism 10 has secured thereto a specially designed summary punch mechanism 20. The two machines are secured together at 4 by a hook and pin and at 5 by a bracket on each machine through which is passed an easily removable pin 6.

The tabulator is of the well known direct subtraction type of Powers machine in which data is sensed from perforated cards, fed seriatim by picker knife 8 from a card magazine 7 (Fig. 3) to a sensing chamber where each card is held by a card stop 9 until sensed by the ascending pins 12 in the lower pin box, which are carried up by the box which is driven by an eccentric 14 on the main drive shaft 15 of the machine. Only those pins which find perforations pass through the card and are locked up by a locking slide 16 (Figs. 3, 5, and 25) which provides them with positive driving action upon further upward movement of the pin box to elevate the set pins 17. The set pins are provided with extrusions 18 which cooperate with cam faces on locking slides 19 for locking the set pin in elevated position. A second extrusion 22 cooperates with a second slide 23 which is cammed to the left (Fig. 3) by the upward movement of the pin for the purpose of initiating the taking of a total. The locked set pins are released near the end of each machine cycle by the action of a retract bail 24 secured to shaft 25 by an arm 26 in a manner described hereinafter. The slide 23 is only moved when a new pin is actuated as on a change of designation, and this function is utilized to control the taking of totals as will be described hereinafter. The sensing pins 12 are released by the action of cam operated arm 27.

The card picker 8 is actuated by an arm 11 which is secured to a shaft 3 (Figs. 24 and 25)

having an arm 19 secured thereon which is connected by a link 20 to a follower arm 21 for a cam 28 secured to main drive shaft 15.

The set pins 17 are adapted to raise stop members 30 in the head of the tabulator through the medium of translator wires 31 in a removable translator 32. The stop basket disclosed in Figs. 2 and 5 is the same in principle and operation as that disclosed and described in a patent to W. W. Lasker No. 1,780,621, issued November 4, 1930. Any differences in appearance are due to manufacturing changes which in no way alter the principle of operation. In fact, any well known form of stop basket may be used without altering the invention. For the purpose of this description, it is sufficient to note that a selected stop 30 is elevated into the path of a rack sector 35 which is adapted to cooperate with an accumulator 36 in a well known manner. The wheel 36 is meshed with the sector under control of a fan cam 37, as will be described hereinafter.

At this point it would be well to note that the several parts of the tabulator are driven from a main drive shaft 15 in the base. This shaft is actuated and controlled by mechanism described and disclosed in the patent to W. W. Lasker No. 2,044,119, issued June 16, 1936. The mechanism of the head of the machine is actuated by a main drive shaft 33, which is connected to the shaft 15 by a vertical shaft and suitable gearing. The shaft 33 (see also Fig. 13) controls a front drive shaft 34 in the head through the medium of a link 38 secured to a gear 2901 on the shaft 33 and a crank arm 39 on the shaft 34. Shaft 33 carries cams for controlling the rear totalizer while the front shaft actuates the fan cams 37 for controlling the front accumulator.

Each of the type sectors 40 (Fig. 2) of the tabulator is pivotally carried by a shaft 41 mounted in the frame of the machine and carries the numeral types 42 adapted to be imprinted on the usual record sheet placed on the paper platen 43. Associated with each type sector is a rack sector 35 which is connected with the type sector by means of a stud 44 in the rack sector which extends into a slot in the type sector. A spring 45 connected between the rack sector and an extension on the type sector tends to keep the type and rack sectors in a predetermined relation. Another spring 46 connected between the extension and the frame of the machine tends to advance the type and rack sectors when a zero stop 47 is lowered out of the path of a depending lug on the rack sector. The zero stops 47 are individual to the rack sectors and they are lowered at the proper time during accumulating and total taking cycles to permit the forward movement of the type and rack sectors. After these sectors have been retracted, the zero stops are raised to hold the sectors in retracted position. This method of lowering and raising the zero stops both during tabulating cycles and total cycles is well known in the art and does not require description here. Upon release by the zero stops the sectors are positioned by stop members 30 in the stop basket in accordance with data sensed from the card.

There are ordinarily seven computing units in the standard tabulator, and accordingly the rack sectors 35 in each of the seven computing units control the setting of front or grand total accumulators 36. Each type sector is connected through a link 48 (see also Fig. 7) to the usual set of rear racks 49 and 50 with which a rear accumulator wheel 51 cooperates in a well known manner. Accordingly, the movements of the type sectors 42 in each computing unit are communicated to the rear set of racks 49—50 of the same unit and either the front accumulator 36 of any unit or the rear accumulator 51 of a rear computing unit can control the movement of the type sectors 42 during the total operations.

In the tabulator disclosed herein items sensed from the cards are entered in the rear accumulator 51 and, upon change of designation or the taking of a total, the amount standing in the rear accumulator is transferred to the front accumulator 36.

The accumulator 36 is carried in a swinging frame 52 which is actuated by a link 53 under control of a fan cam 37 which cooperates with a rocking arm 54 having two studs 55 and 56 thereon. The studs are adapted to engage notches in the draw link 53. The control of these members will be described hereinafter.

The rear accumulator 51 is positioned in relation to the racks 49 and 50 by a T link 60. The control of this link will also be described later.

In the standard Powers direct subtraction tabulator, the rear accumulators are conditioned to add during tabulating cycles while the front accumulators are normally conditioned to non-add. Means well known in the art are provided to condition the rear accumulators to add during tabulating cycles. Without describing that mechanism in detail, as it is fully detailed in Patent 2,124,177, it may be observed that it is necessary to retain the T-shaped accumulator shift link 60 (Fig. 7) in engagement with stud 59 during tabulating cycles to condition the rear accumulator of the corresponding computing unit to add. To condition the front accumulators 36 for non-adding, well known mechanism is provided which retains the shift link 53 in neutral position during tabulating cycles. When the shift link 53 is in this position, the upper stud 55 on rocking arm 54 cannot cooperate with the notch in the upper edge of the link and the lower stud 56 on this arm cannot cooperate with the notch in the lower edge of the link. Accordingly, the shift link remains in its rearward position during the tabulating cycles, thus preventing the front accumulator 36 from engaging the rack sectors 35.

But when the total operation is initiated and total shaft 108 is rocked, as will be described later, the rear accumulators are conditioned for total taking with clearing and the front accumulators are conditioned to add. When the total shaft is rocked, the mechanism which retains shift link 53 in neutral position during tabulating cycles is rendered ineffective. When this occurs, shift link 53 rises under the influence of a spring and the upper stud 55 on rocking arm 54 is permitted to cooperate with the notch in the upper end of the link. It is well understood in the art that, when the stud 55 cooperates with the notch in the upper edge of shift link 53, the front or grand total accumulator 36 is conditioned to add. Likewise, when total shaft 108 is rocked, well known mechanism conditions the rear or total accumulator for total-taking with clearing. Accordingly, as previously stated, whenever a total taking operation is initiated on the standard Powers direct subtraction tabulator, the rear accumulator in each computing unit is conditioned for total-taking with clearing and the front accumulator in each unit is conditioned to add with the result that a group total taken from the rear accumulator of each computing unit is transferred to the front accumulator of the same unit and the rear accumulator is cleared.

When a grand total operation is initiated and the grand total shaft 112 is rocked, as will be described later, the rear accumulators are conditioned to non-add and the front accumulators are conditioned for total-taking with clearing. Upon the rocking of the grand total shaft, well known mechanism causes the shift link 53 to be pulled into its lowermost position, thereby causing the lower stud 56 on rocking arm 54 to cooperate with the notch in the lower edge of the shift link and to condition the front or grand total accumulators for total taking with clearing. Likewise, when the grand total shaft is rocked, well known mechanism conditions the rear accumulators to non-add. Accordingly, when a grand total operation is initiated on a standard Powers direct subtraction tabulator, the front or grand total accumulators 36 are conditioned for total-taking, with clearing, while the rear accumulators are conditioned for non-adding.

*Punch setting mechanism*

For the purpose of transferring to the summary punch the totals taken from the rear accumulators and the grand totals taken from the front accumulators of the tabulator, a mechanism similar to that disclosed in U. S. Patent 1,998,281, previously referred to, is attached to the standard direct subtraction tabulator. Though well known, this mechanism will now be described in some detail.

A shaft 61 (Figs. 2, 5, 10, 11, and 12) is provided to correspond to each computing unit. Each shaft 61 carries a pair of cheek plates 62, each pair of plates being coordinated with one computing unit. The plates of each pair are splined to shaft 61 and are connected by the rods 63 and 64 to constitute a rigid rocking frame. As these rocking frames coordinated with the several computing units are identical, a description of one will be sufficient. Between the two cheek plates 62 of the rocking frame, and loosely mounted on shaft 61, is a number of stepped storing sectors 65 equal to the number of denominational orders in the coordinated computing unit.

Each storing sector may assume any one of ten differential positions relatively to the rocking frame, and may be retained or locked in any of these positions by a pawl 67. The pawls 67 are rotatably mounted on rod 64, supported by the cheek plates, and they are biased in a counter-clockwise direction, viewed from the left side of the machine (Fig. 10), by individual biasing springs 66, each of which is tensioned between a pawl 67 and the corresponding storing sector 65. The engagement of the pawls 67 with the rack teeth of the storing sectors 65 is controlled by a bail 68 which is also mounted on rod 64 and is spring-biased in a clockwise direction, as viewed from the left side of the machine by spring 69. The pawls 67 are held out of engagement with the rack teeth of storing sector 65 by a latch 70 which is pivoted on one of the cheek plates 62 and engages a depending arm 71 of the bail 68. The latch 70 is caused to release the bail arm and allow the pawls to be moved into engagement with the rack teeth of the storing sectors 65 by a stop 72. This stop is mounted on the frame and is engaged by the latch 70 when the rocking frame reaches the end of its forward stroke, that is, its movement in a clockwise direction (Figs. 10-12).

Each storing sector includes a depending sensing arm 73 pivoted to a forwardly projecting arm of the sector. The lower ends of the sensing arms are guided for vertical movement within a suitable comb 74 extending between suitable brackets and are positioned directly above the rearward extensions or boots 75 on the type sectors 40. The rearward arcuate face of storing sector 65 is formed with ten steps which correspond to the digits to be transferred to the punching or other recording device and which cooperate with a punch setting slide 76 to be described later.

In order to position and control the setting of the storing sectors the entire assembly including the step sectors, pawls, cheek plates, etc., are rocked about the shaft 61. This is done by a rocker shaft 80 supported by brackets 81 attached to the frame of the tabulator. An arm 82 is secured to the shaft and a link 83 is pivoted thereon, and pivoted to the cheek plates is a second link 84, links 83 and 84 being resiliently connected by a spring and slot connection. The rock shaft 80 is rocked by an actuating shaft 85 on which is secured an eccentric having a link 86 connected to a pitman 87 fixed to shaft 80. A one revolution clutch 88 (Figs. 5 and 13) couples the eccentric to a continuously running gear 89 driven by a gear 2901 on a continuously running main drive shaft in the head of the tabulator. As hereinafter described, the clutch may be rendered effective when totals and/or grand totals are taken. Accordingly, the storing sectors are rocked only during total and/or grand total operations.

The manner in which the storing sectors 65 are set will now be described. Before entering upon this description, it may be observed that the depending arm 71 of bail 68 is normally disengaged from latch 70 (Fig. 12), and the pawls 67 are accordingly in engagement with the rack teeth of storing sectors 65. It will also be noted that in normal position (Fig. 5) the eccentric on link 86 has not reached the full limit of its downward stroke. During each group total operation and grand total operation the cheek plates 62 are rocked first in a counterclockwise and then in a clockwise direction (Fig. 10), as viewed from the left side of the machine. When the assembly begins its counterclockwise movement, the pawls 67 strike a cross bar 91 on the frame of the machine, thereby rocking the pawls in a clockwise direction against the action of springs 66, and moving them out of engagement with the rack teeth of storing sectors. The pawls 67 are then locked out of engagement with the rack teeth of the storing sectors by the latch 70, for the clockwise movement of the pawls causes a similar movement of the bail 68, thus bringing the depending arm 71 of the bail into engagement with the latch. The pawls 67 remain locked in this position during the clockwise movement of the rocking frame. The disengagement of the pawls from the rack teeth of the storing sectors causes springs 66 to align the sectors against a slam bail mounted on the tie rod 63 so that the sectors will then all move forward in the same position relative to the rocking frame. As the rocking frame continues its clockwise movement, the sensing pins 73 engage the rearward extension or boot 75 of the type sectors 40, thus differentially arresting the forward movement of the storing sectors, and setting them in accordance with the values in the type sectors. The rocking frame continues its clockwise movement, however, carrying with it the pawls 67. When the rocking frame reaches the end of its clockwise movement, the latch 70 strikes against the stop 72 and releases the depending arm 71 of the bail. Upon the release of this arm by the latch, the pawls 67 engage the rack teeth of the storing sectors. The shaft 88 is then rocked in a counter-clockwise direction, thereby returning the rocking frame to its normal position. After the rocking frame is restored to normal, the storing sectors 65 and the rocking frame occupy the same relative positions that they occupied at the end of the clockwise movement of the frame, i. e., in accordance with the data in type sectors 40, and are in position to be sensed by the punch setting slides 76.

The relation between the setting of the type sectors 40 and the steps of the storing sectors will now be explained. When the storing sectors are in zero position and the rocking frame is in its normal position, the slam bail on the rod 63 is nine steps in front of the forward edge of each storing sector and the uppermost or zero step on each sector is aligned with one of the bars 76 which control the setting of the punch. In Fig. 13, the rocking frame is shown in its normal position, with the storing sectors in their zero positions with their uppermost or zero steps aligned with the bars.

Let it be assumed that type sector 40 is retained in its "five" position (Fig. 11) during a total cycle and that the storing sector. 65, corresponding thereto, has previously been set at zero, as has the storing sector illustrated in Fig. 13. During this cycle the rocking frame is moved first in a counter-clockwise and then in a clockwise direction. As the rocking frame begins its counter-clockwise movement, the cross bar 91 (Fig. 10) strikes the upper arms of pawls 67, thereby causing latch 70 to lock the pawls out of engagement with the rack teeth of the storing sectors 65. The storing sector under consideration, having been set at zero, rotates clockwise under the pull of springs 66 into contact with the slam bail on rod 63, when the pawl disengages its rack teeth. It then moves forward with the rocking frame until its sensing pin 73 (Fig. 11) abuts against the rearward extension of the corresponding type sector. The rocking frame continues its clockwise movement until it has moved slightly more than five steps in advance of the storing sector. At this time, stop 72 releases latch 70, causing the pawls to latch the storing sector five steps behind the rocking frame. The rocking frame then rocks in a counter-clockwise direction into its normal or Fig. 12 position. As the storing sector under consideration is "five" steps behind the rocking frame, or in a position five steps farther in a clockwise direction than its position in Fig. 13, it will be evident that the "five" step is aligned with the corresponding punch bar 76 when the rocking frame reaches its normal position.

If a type sector as shown in Fig. 2 is set at "one," the corresponding storing sector will be rocked counter-clockwise in the frame until the sensing finger contacts the extension on the sector after which further counter-clockwise movement of frame carries the pawl over "nine" teeth before it is released by the stop 72. When the frame is then rocked in a clockwise direction the sector is positioned with the "one" step in alignment with the punch setting bar 76. If the type sector had been set to "two," the storing sector would be positioned eight steps in a clockwise direction relatively to its position in Fig. 13, thereby bringing the "two" step into alignment with the punch bar. From the foregoing examples, the manner in which the storing sectors are set for other positions of the type sectors will be self-evident.

Figure 14:
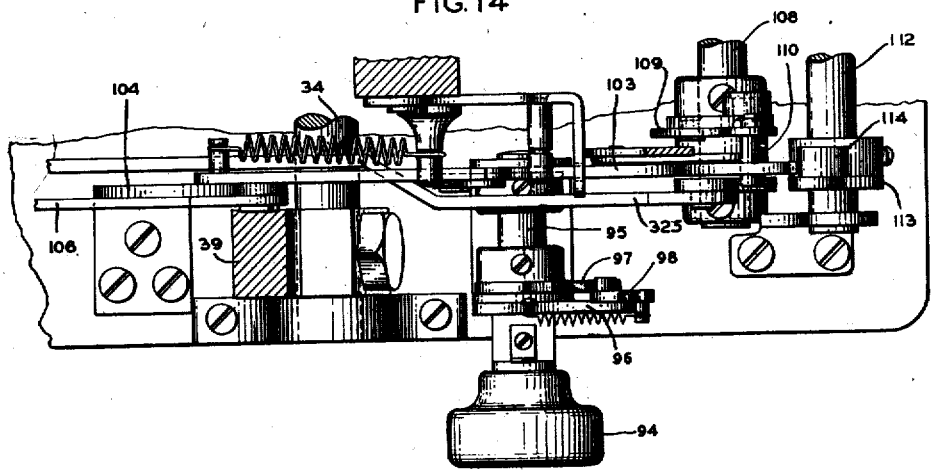
Fig. 14 is a detail plan view of the punch control mechanism.
Figure 15:
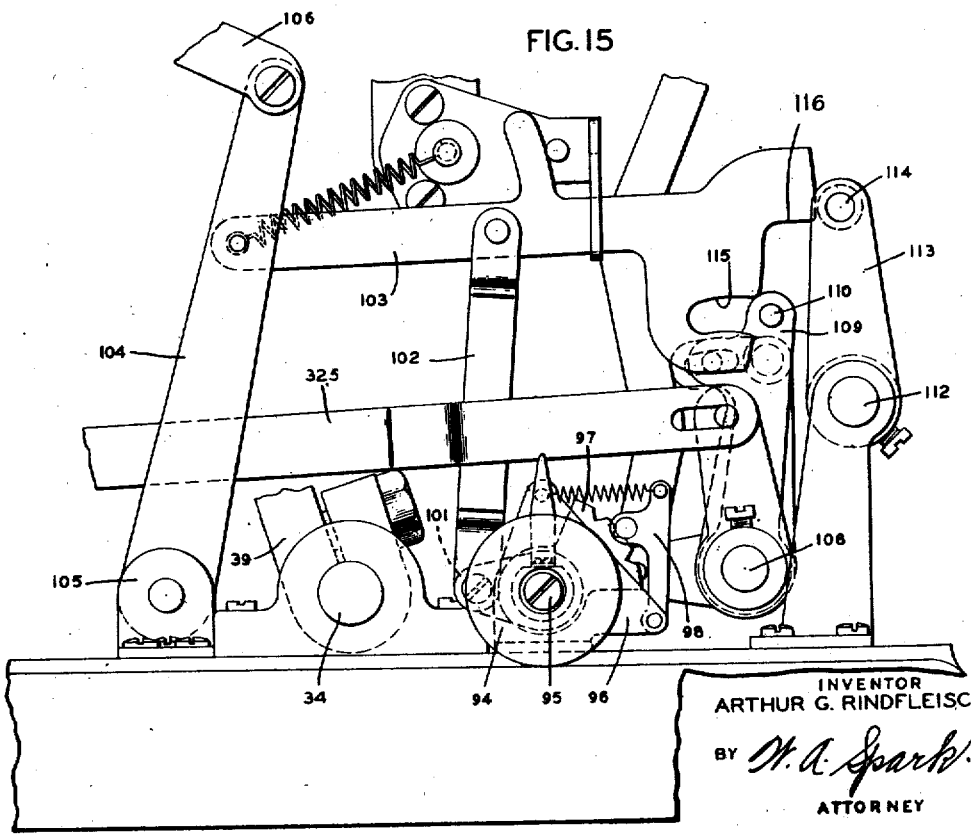
Fig. 15 is a detail position view of the punch control mechanism in the grand total position.

A mechanism is provided for controlling the operation of the one revolution clutch 89 for actuating the eccentric for rocking the storing sectors and controlling the initiating of a punch operation. This mechanism is optionally settable to either of three positions whereby it is rendered effective only when totals are taken, or only when grand totals are taken, or when totals and grand totals are taken. It comprises a knob 94 (see Figs. 14 and 15) which is secured to a stub shaft 95 journaled in a bracket 96. Secured to the shaft is an arm 97 having three detent notches therein adapted to cooperate with a spring-pressed positioning pawl 98 which is pivotally mounted on the bracket. Also secured to shaft 95 is an arm 101 to which is secured one end of a link 102. The other end of link 102 is secured to an interponent 103 which is pivotally connected to a lever 104. The lever 104 is pivotally mounted at its lower end in a bracket 105 secured to the frame of the machine. The top end of lever 104 is pivotally secured to the link 106 which controls the operation of the one revolution clutch 89, as will be described hereinafter. Secured to the total shaft 108 is an arm 109 having a pin 110 thereon adapted to cooperate with the interponent 103. Secured to the grand total shaft 112 is an arm 113 having a pin 114 thereon which is adapted to cooperate with the interponent 103. With the parts in the position of Fig. 15, when the grand total shaft 112 is rocked counter-clockwise by means to be described later, pin 114 pushes the interponent 103 to the left rocking the lever 104 which, in turn, moves the link 106 toward the rear of the machine (left Fig. 13), thus actuating the one revolution clutch. With the parts in this position if the total shaft 108 is actuated, the arm 109 will be rocked counter-clockwise, but the pin 110 will not be effective to actuate interponent 103 due to the fact that it is opposite and will move in the slot 115. With the parts in the position of Fig. 16, the operation of either shaft 108 or 112 will actuate the interponent 103, as both pins 114 and 110 are effective.

Figure 17:
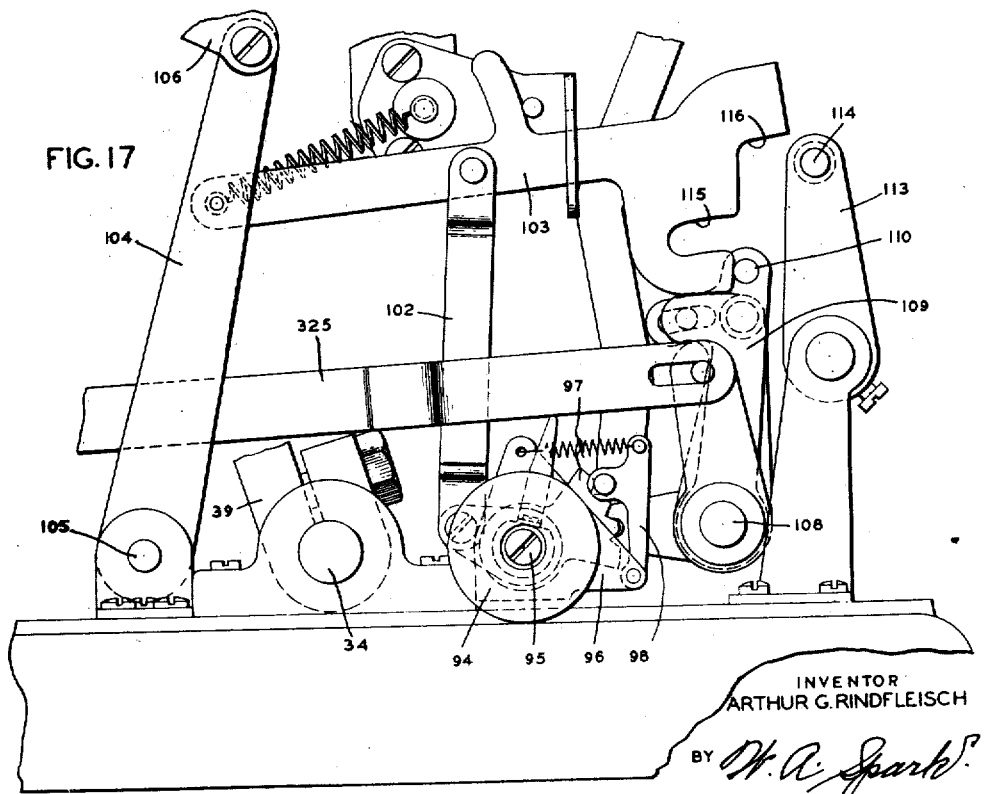
Fig. 17 is a detail position view of the punch control mechanism in the total position.

If the knob 94 is positioned as shown in Fig. 17, only the operation of total shaft 108 will effect the interponent 103 as the pin 110 is the only one opposite the working edge of the interponent. The pin 114, being opposite the cutout portion 116, will be ineffective. Secured to the link 106 (Fig. 13) is a lug 117 which cooperates with a bell-crank 118 pivoted on a sub-frame 119. Pivotally mounted on the lower end of bell-crank 118 is a latch member 121, which when withdrawn by the counter-clockwise rotation of bell-crank 118 trips the one revolution clutch 89.

Figure 16:
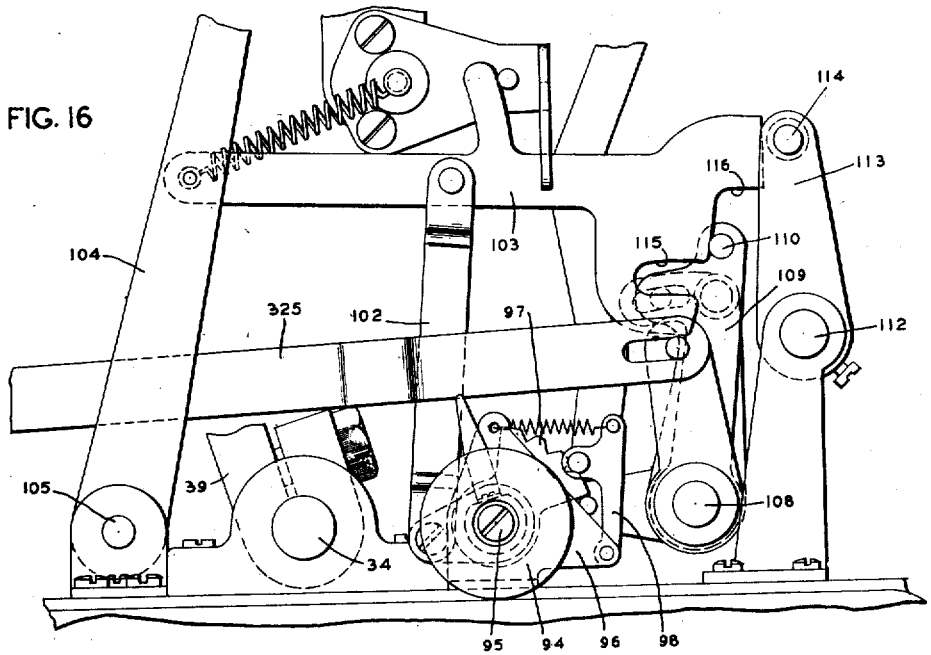
Fig. 16 is a detail position view of the punch control mechanism in the total and grand total position.

Thus, according to the type of operation desired, knob 94 may be set selectively to render clutch 89 effective when (1) Group totals are taken (as in Fig. 17),
(2) Grand totals are taken (as in Fig. 15), or
(3) Group totals and grand totals are taken (as in Fig. 16).

Figure 18:
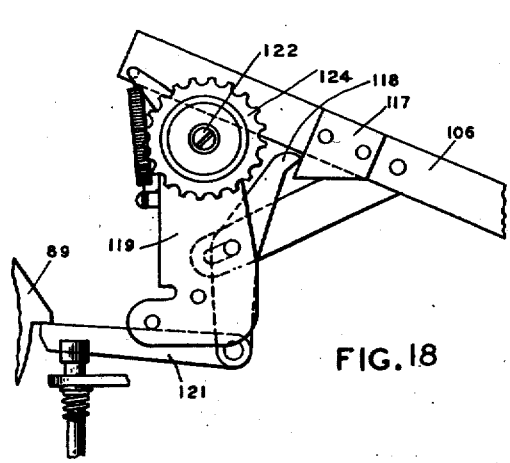
Figs. 18 and 19 are detail view of the punch control enabling device in effective position.
Figure 20:
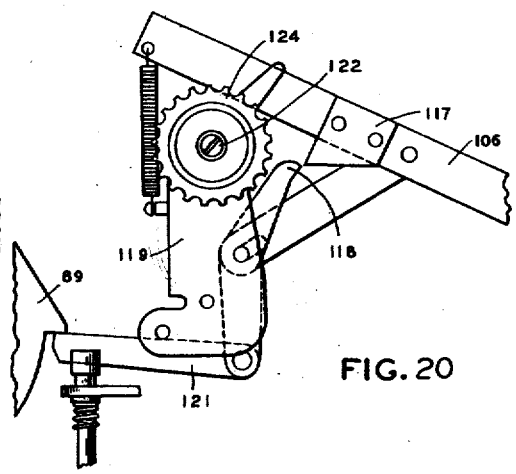
Figs. 20 and 21 are detail views of the punch control enabling device in ineffective position.
Figure 19:
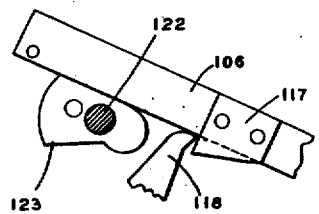
Figure 21:
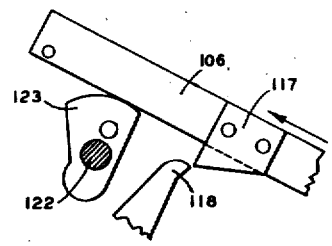

Rotatably mounted in sub-frame 119 is a stub shaft 122 on which is mounted a cam 123 and a knob 124 for disabling the link 106. In Figs. 18 and 19 the knob and cam are shown in position to make link 106 effective. In Figs. 20 and 21 the parts are shown in position to make the link ineffective. It will be noted that the cam 123 has elevated the link 106 so that the lug 117 is out of the path of bell-crank 118, thereby preventing the link 106 from tripping the latch 121.

Figure 22:
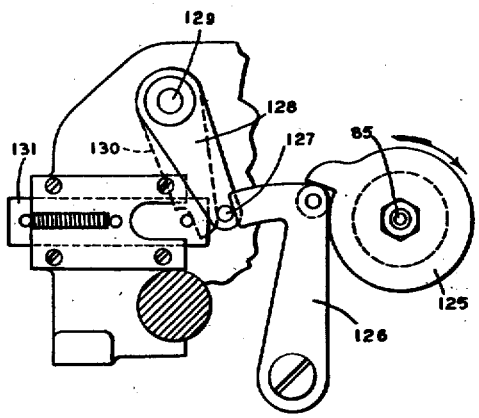
Figs. 22 and 23 are detail operation views of the mechanism in the tabulator for tripping the punch mechanism.
Figure 23:
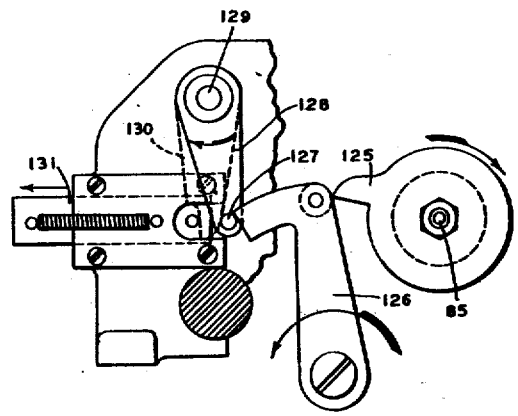

Secured to shaft 85 (Figs. 22 and 23) is a cam 125 which is adapted to trip the punch and cause it to perforate and eject the punched card. The finger of cam 125 is adapted to contact and rotate an L-shaped lever 126 in a counter-clockwise direction. The lever, in turn, contacts pin 127 on an arm 128, which is secured to one end of a shaft 129, on the other end of which is secured a second arm 130 which is adapted to move a slide 131 to the left (Fig. 23). Slidably mounted on the frame of the punch is a bar 132 (Figs. 5 and 13) which is connected to a bell-crank 133 (see Fig. 6), the other end of which is connected to a one-revolution clutch 134 by a rod 135. Clutch 134 is of any suitable construction and is mounted on the main drive shaft 136 of the punch.

Summary punch mechanism

The patent to Kuhlman and Becker No. 1,998,281 discloses a punch mechanism, optionally attachable to a tabulator of the type described above, for punching cards showing the totals yielded by the tabulator.

Figure 4:
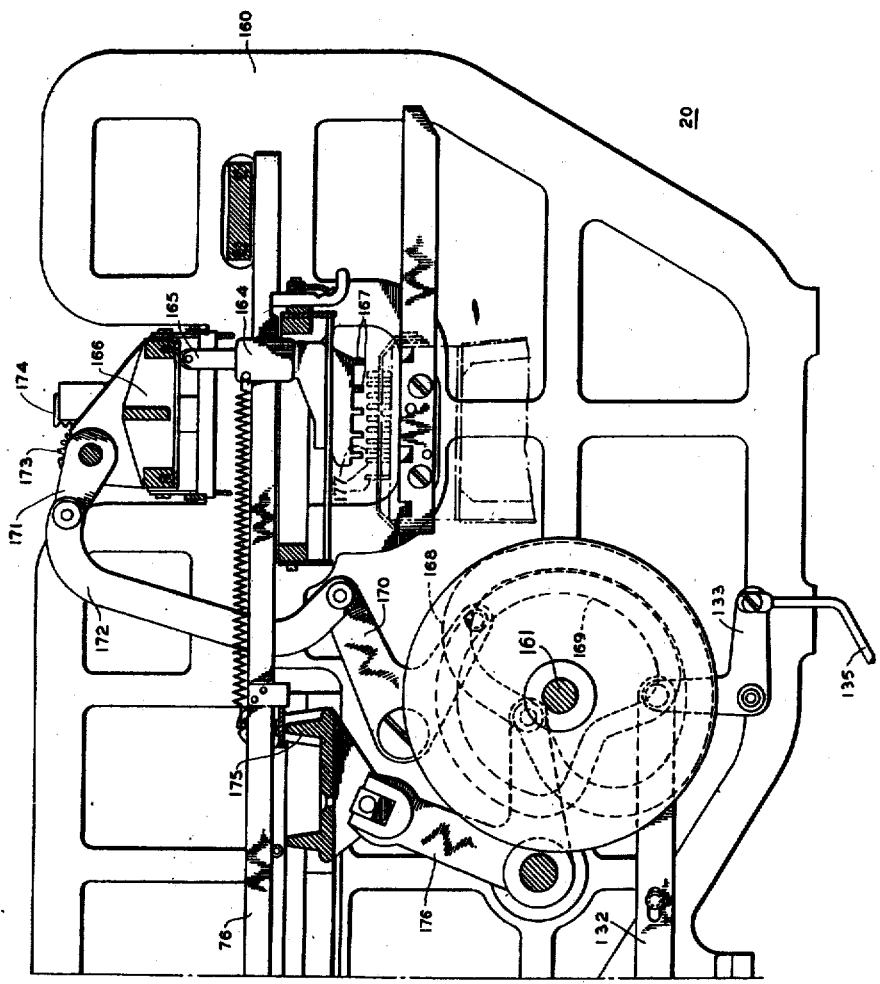

This machine is similar to the punch 20 disclosed in Figs. 1, 4, and 6, and is of the gang type in which data is set up and the entire card punched in one stroke. There is a base section which contains the card magazine 140, punches 141, card pocket 142 and associated drive mechanism. The base also contains a plurality of set bars 143 which are set up in accordance with the data to be punched and then locked by the locking slides 144. The set bars, in turn, position pins 145 which directly actuate the punches.

Cards are fed seriatim from the card magazine 140 by a picker knife 146 which is actuated by a cam 147 on a drive shaft 136 at about 195° of the cycle (Fig. 53). The card is carried by feed rolls 148 to a card chamber where it is held by a card stop 149 from approximately 105° of the punching cycle until approximately the end thereof. During the next punching cycle it is fed to card pocket 142 by eject rolls 150. The punch basket 151 carrying the punches 141 starts to rise at 193°, and is fully up at 313° and restored at 8° of the next cycle. While in its fully raised position, i. e., 313°, the card is punched. Drive shaft 136 is driven through a train of gears not shown by the motor 153 (Fig. 1).

Mounted above the set bars and punches is a frame 160 in which is mounted a cam shaft 161 for actuating the set up mechanism. This shaft is driven by a chain 162 (see Fig. 1) from drive shaft 136. Mounted between rolls 163 (see Fig. 5) in the frame at one end is a plurality of spring-urged sensing bars 76, one for each of the stepped sectors 65 in the tabulator. Secured to the other end of each bar is a block 164 (see Fig. 6), the upper end of which is provided with a roller 165 adapted to move in a reciprocating head member 166. Dependent from each block 164 is a five-fingered interponent 167 which functions in conjunction with Y-wired translator wires, as hereinafter described, to effect corresponding 90-column selections of stop bars 143 in accordance with the number represented by the lineal displacement of the associated slide 76.

On shaft 161 is secured a pair of box cams 168 and 169 formed as shown in Figs. 4 and 6. Cam 169 actuates the head member 166 through the follower bell-crank 170 which is connected to an arm 171 by a link 172. The arm 171 is secured to a shaft, journaled in head member 166, on which is secured a spur gear 173 adapted to cooperate with a rack 174. When the follower is drawn down by the box cam, the shaft is rotated in a counter-clockwise direction, causing gear 173 to roll down rack 174, thus depressing the head 166 which, in turn, depresses the punch interponent 167 to set up the punch mechanism.

The cam 168 is adapted to actuate a restoring bail 175 for the bars 76, through the medium of follower bell-crank 176.

After the storing sectors 65 are positioned in the tabulator, at about 260° of the cycle after a total is taken, the bars 76 are released by the bail 175 and move to the left (Fig. 6) to engage the steps in accordance with the digits indicated. The movement of the bars positions the interponent 167 over the correct wires in the removable translator 177 leading to the set bars 143. The cam 169 then acts at about 135° of the punch cycle to depress the head 166, thus setting the set bars, which are then locked in effective position. At the end of the cycle they are released by a cam not shown.

In the summary punch mechanism disclosed in the above mentioned Patent No. 1,998,281, it will be noted that the summary cards are perforated in accordance with the Powers 45-column numerical code in which each digit is represented by a single perforation. In the patented arrangement, inasmuch as the extent of lineal displacement of each sensing slide varies with each different setting of the associated stepped storing sector, it was a comparatively simple matter to select a corresponding set bar in the punch mechanism for each value to be perforated in the summary cards.

However, in tabulating systems that employ the Powers 90-column numerical code, in which each odd digit is represented by a single perforation, and each even digit by a combination of perforations comprising the next lower odd digit perforation and the "nine" perforation, it is desirable that the summary cards be punched in a similar manner. Therefore, the present invention provides means to utilize the differential lineal movements of slides 76 (Figs. 5 and 6) to select set bars 143 in accordance with the 90-column code. To this end, the punch translator wires 177—1, —3, —5, —7, and —9, which lead respectively to the "1," "3," "5," "7," and "9" perforation positions of the upper zone of a 90-column card, are each provided with Y-wired branches which extend through the top of the punch translator frame 177. All of these branches are aligned in the path of movement of interponent 167, and all except the left branch of wire 177—9 are spaced apart a distance equal to the distance between adjacent stepped faces on storing sector 65. The left branch of wire 177—9 is separated from the right branch by a distance equal to one and a half times that between the other branches.

It may be noted at this point that although zeros are not ordinarily punched when the 90-column code is employed, there are accounting systems in which the punching of zeros is desirable. Therefore, the present embodiment illustrates a punch translator provided with a wire 177—0 which leads to the "0" perforation position in a 90-column card. When such a wire is used its upper end is spaced apart from the right branch of wire 177—1 a distance equal to that between adjacent stepped faces on storing sector 65.

In addition to the modification in the translator wires, the shape of the interponent on the sector sensing slides is also modified from that of the corresponding element in Patent No. 1,998,- 281, in that it is provided with five pendant extensions. Counting from the left in Fig. 6 the first four are spaced apart a distance equal to twice that between adjacent steps on storing sector 65, whereas, the fourth and fifth are spaced apart a distance equal to two and a half times that of adjacent steps on the storing sector. The several elements are so arranged that when slide 76 is fully restored by cam 168, the right hand extension on interponent 167 is moved to the right of the upper end of wire 177—0 a distance equal to that between the left end of slide 76 (see Fig 5) and the uppermost or "zero" step on the associated sector 65.

With the foregoing arrangement in mind it is apparent that when a storing sector 65 is set at "zero" during a total taking operation, interponent 167 is moved to the left during the subsequent punching operation sufficiently to place its right hand extension in alignment with wire 177—0, as in Fig. 6A, whereas, the remaining extensions on the interponent are arranged between the upper ends of the branches of the other translator wires Thus, when head 166 is lowered by cam 168, only wire 177—0 is depressed to set the corresponding "zero" set bar 143. When the storing sector 65 is set at "one," interponent 167 is moved sufficiently to align its right hand extension with the right branch of wire 177—1. In this position, the remaining extensions on the interponent are arranged between the branches of the other translator wires, as in Fig. 6B, whereby, when head 166 is lowered, only the wire 177—1 is depressed to set the corresponding "one" set bar 143. Similarly, when sector 65 is set at "three," "five," "seven," or "nine" (see Fig. 6D), the right hand extension of interponent 167 is aligned with the right hand branch of wire 177—3, —5, —7, or —9, respectively, and the remaining extensions are ineffective. When head 166 is lowered in each instance, a single set bar 143, overlying the 90-column code perforation position corresponding to the value on the storing sector, is depressed.

When sector 65 is set at "two," interponent 167 is moved sufficiently to align its right hand extension with the left branch of wire 177—1, as in Fig. 6C. In this position the left hand extension of the interponent is aligned with the left branch of wire 177—9, whereas the remaining extensions on the interponent are arranged between branches of the other translator wires. Thus, when head 166 is lowered, wires 177—1 and 177—9 are depressed to set the corresponding bars 143, whereby the punch mechanism is conditioned to perforate the index positions on a card that represent a "two" in the 90-column code. Similarly, when sector 65 is set at "four," "six," or "eight," the right hand extension of interponent 167 is aligned with the left branch of wire 177—3, —5, or —7, respectively, and the second, third, or fourth from left extensions on interponent 167 is aligned with the left branch of wire 177—9. When interponent 167 is lowered in each instance, two set bars 143, overlying the 90-column code perforation position correspond-ing to the value on the storing sector are depressed.

Total taking control device

The tabulator on which the invention is to be used has an automatic control mechanism which comprises a normally ineffective control unit adapted to function only during a total taking operation and which is set in motion upon the sensing of a change in the designatory matter, i. e., either change in employee or department number. As the new designation is sensed, actuating slides in the sensing chamber cooperate with their associated pre-positioned interponents to trip the total control mechanism, thereby placing it under the control of the main drive shaft and thus initiating a total taking operation. During the total taking operation the control mechanism operates through a series of steps during which it serves to disable the card feeding and recording means, to hold the card in the sensing chamber, to effect a total taking operation, and finally to restore the operating mechanism to normal. Thereafter the information contained on the card in which the change-of-designation occurred is sensed and entered into the computing mechanism. This control mechanism is adapted to condition the tabulator to take either a total or grand total, and is described hereinafter in detail.

Located above and in front of the upper pin box is a series of selectively positionable members 180 (Figs. 25 and 26) equal in number to the slides 23. Each member 180 has a dependent interponent 181 secured thereto, the head of which is adapted to be interposed between either of two bail bars 182 and 183, and the nose of the associated actuating slide 23. In its highest position, the member 180 maintains the interponent clear of the bail bars and slide 23, and is, therefore, ineffective (see 180A, Fig. 25).

With the head of interponent 181 positioned opposite bail 182 (180B) this bail alone will be rocked when the associated actuating slide 23 is moved by a change-of-designation and a total will be taken. If the head of interponent 181 is positioned opposite the bail 183 (180C), both bails will be actuated and a total and grand total will be taken.

In order to set the several mechanisms of the computing mechanism for taking a total, front total shaft 108 must be rocked at the beginning of the total taking cycle and held rocked during that cycle. For this purpose, there is secured to a sleeve fixed on shaft 185 (Fig. 25) a triangular-shaped cam 186 (Fig. 32) having six low portions 187 and three high portions 188. When the total taking control mechanism is at rest, a low portion 187 is opposite a follower roller 189 carried by a lever 191 which is pivotally mounted on a stud in a suitable bracket on the frame and is connected at its forward end to a link 190. The upper end of link 190 is provided with two shoulders one of which cooperates with a stud 193 on an arm 194 secured on a rock shaft 195 which is journaled in a suitably mounted bracket (not shown). An arm 196 (Fig. 3) secured on the other end of rock shaft 195 is connected by link 197 with an arm 198 (Fig. 7) on front total shaft 108. At the first actuation of shaft 185, the adjacent low portion 187 is moved under follower 191 and, therefore, no motion is imparted to the associated linkage during the conditioning cycle. At the second actuation of shaft 185, a high portion 188 is placed in register with follower 191, thereby actuating the associated linkage to rock front total shaft 198 clockwise and hold it rocked throughout the total taking cycle. At the third actuation of shaft 185, follower 191 rides onto a low portion of cam 198, thereby permitting total shaft 198 to be restored by its spring (not shown) to return the computing mechanism to normal accumulating condition.

When, during a grand total taking operation, a grand total is to be taken from front accumulator 36, link 199 is shifted forwardly to its grand total position, as hereinafter described, so that its other shoulder engages a stud 200 on an arm 201 secured on rock shaft 202 which is journaled in a suitable bracket in the same manner as rock shaft 195. An arm 203 (Figs. 3 and 7) secured on the other end of rock shaft 202, is connected by link 204 to an arm 205 secured on rear grand total shaft 206. Thus, when T link 199 is pulled downwardly, while in engagement with stud 200, rear grand total shaft 206 is rocked counterclockwise to set the several mechanisms of the computing mechanism for taking a grand total. The arrangement of shoulders on the link 190 is such that when it is pulled downwardly while in engagement with either stud 193 or 200, the vertical face of the opposite shoulder abuts the associated stud to prevent any forward or rearward movement of link 190.

*Actuating mechanism of total taking control mechanism*

The mechanism for actuating shaft 185, during total and grand total taking operations, includes a pair of snail cams 209 and 210 secured on main drive shaft 15 (Fig. 24). Cam 209 (Figs. 24 and 33) is arranged to elevate a follower roller 211 on arm 212 pivotally mounted on stud 213, at the time that eccentrics on shaft 15 have elevated the sensing pin box to its highest position. A push rod 214, connected to the forward end of arm 212 and guided in a suitable slot (not shown) in the frame of the machine, operates a spring-urged arm 215 pivotally mounted on a stud 216. An actuating pawl 217 is pivoted on the rearmost end of arm 215 and is spring-urged against a six-toothed ratchet 218 secured on the extreme left end of shaft 185 (Fig. 24). The teeth on ratchet 218 are arranged in pairs and a blank space corresponding to one tooth is provided between each pair. The ratchet is so secured on shaft 185 that when the total taking control mechanism is at rest, during accumulating cycles, pawl 217 is moved idly during each revolution of main drive shaft 15.

Cam 210 (Figs. 24, 31, and 35) is similar in shape to cam 209, but, as hereinafter explained, is so positioned on shaft 185 as to be effective approximately 30° of a machine cycle thereafter, whereby it serves to elevate a follower roller 220 on arm 221, which is pivotally mounted on stud 213, shortly after the pin box has started downwardly. Connected to the forward end of arm 221 is a forked push rod 222 arranged to operate a spring-urged arm 223 pivotally mounted on shaft 216. An actuating pawl 224 is pivoted on the rearward end of arm 223 and is spring-urged against a three-toothed ratchet 225. The teeth on this ratchet are equidistantly spaced and are so arranged that a blank space, corresponding to two teeth, is provided between the teeth. Ratchet 225 is so positioned on shaft 185 that its teeth are complementally arranged with reference to those on ratchet 218, whereby, when the control mechanism is at rest, a tooth on ratchet 225 is in position to be actuated by pawl 224. However, during accumulating cycles, a latch 226 engages a forward extension 242 on arm 223 to hold the arm in its fully raised position so that push rod 222 moves idly up and down under control of cam 210 during each revolution of shaft 15. Latch 226 is pivotally mounted on a stud 227, and is provided with a vertical arm 228 urged clockwise by a suitable spring, having a roller arranged to be operated, when a card having a new designation is sensed, by an arm 230, mounted on rock shaft 231 of the change of designation sensing mechanism.

With this arrangement, it is apparent that the rocking of shaft 231 serves to disengage retaining latch 226 from extension 242 and permit arm 223 to drop on push rod 222. As cam 210 revolves, it elevates push rod 222 and causes pawl 224 to rotate ratchet 225 and shaft 185, through one tooth space (first step of total taking operation) and thereby place the first of a pair of teeth on ratchet 218 in position to be actuated by pawl 217. At the end of the conditioning cycle, cam 209 elevates push rod 214 and causes pawl 217 to rotate ratchet 218 and shaft 185 through one tooth space (second step of total taking operation) and thereby places the second tooth of said pair on ratchet 218 in position to be actuated. At the end of the total taking cycle, cam 209 again elevates push rod 214 and causes pawl 217 to rotate ratchet 218 and shaft 185 through another tooth space (third step of total taking operation) and thereby places another tooth on ratchet 225 in position to be actuated by pawl 224. Obviously, if there were no provisions to the contrary, ratchet 225 would be operated again and the above sequence of operations would continue indefinitely. Therefore, means is provided to latch arm 223 in its fully raised position to insure that shaft 185 is only actuated three times during a total taking operation.

Figure 38:
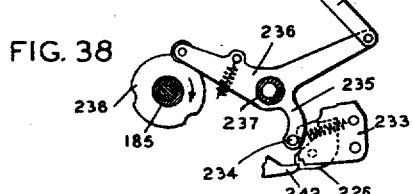
Figure 39:
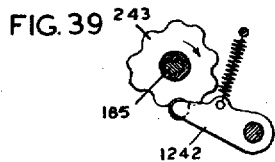

Although the spring on latch 226 serves to maintain the engagement of the latch with extension 242, to hold the arm 223 in raised position during accumulating cycles, and tends to reestablish this relationship after a total taking operation is initiated, each adventitious change of designation that occurred during the total taking operation serves to rock shaft 231 counterclockwise and thereby disengage the latch from the extension. Inasmuch as the last adventitious change of designation occurs immediately before the third step of the total taking operation, latch 226 would be tripped at that time and permit arm 223 to drop against push rod 222 to cause a repetition of the above sequence of operations. Therefore, an auxiliary latch 233, pivotally mounted on stud 227, is arranged to engage extension 242 during total taking operations but is held out of engagement therewith when the control mechanism is at rest by a stud 234, to which it is resiliently connected, mounted on the downwardly extending arm 235 of a three-armed lever 236 (Figs. 24 and 38). Lever 236 is pivotally mounted on a hollow shaft 237, and is provided with a rearwardly extending arm having a follower roller that rides on a cam 238 mounted on shaft 185. Cam 238 is provided with three equally spaced notches, one of which cooperates with the follower roller when the control mechanism is at rest.

As pawl 224 on arm 223 rotates ratchet 225, the roller rides out of the notch on cam 238, thereby rocking lever 236 clockwise which serves to move stud 234 away from the rearward face of latch 233 and permits its spring to draw the latch against the forward edge of extension 242. When the arm 223 is raised to its highest position by cam 210, latch 233 snaps over extension 242 and serves to hold arm 223 in raised position during the conditioning and total taking cycles. At the third step of the total taking operation, the roller rides down into another notch on cam 238, thereby rotating lever 236 counter-clockwise and causing stud 234 to force latch 233 out of engagement with extension 242. However, prior to the complete disengagement of auxiliary latch 233, retaining latch 226, which is but momentarily tripped by each adventitious change of designation, swings forwardly over extension 242 and holds arm 223 in fully raised position until the next change of designation is sensed.

In a tabulating machine of the type disclosed in the drawings the cam 238 also has two other separate and distinct functions. First, to recondition the rear accumulator of the designating unit to add after each total taking operation. Second, to actuate mechanism for selectively controlling the taking of totals in the tabulating units equipped with direct subtraction accumulators in accordance with the characteristic (positive or negative) of such totals. In the latter instance, the mechanism controlled by cam 238 is similar in function to a comparable device disclosed in the above mentioned Patent No. 2,124,177, and is identical to the "credit balance mechanism" shown and described in Patent 2,237,908, dated April 8, 1941. However, since a knowledge of the control of the accumulators in the tabulating units used for accumulating quantitative data is not essential to an understanding of the present invention, the "credit balance mechanism" is not described herein. Insofar as the present invention is concerned it is sufficient to understand that cam 238 is effective, by means of lever 236 and link 241 (Fig. 3), to rock a "credit balance" shaft 240 (Fig. 2) clockwise during total and grand total taking operations to recondition the rear accumulator of the designating unit for adding, as hereinafter described.

Lever 236 is spring-urged counter-clockwise against cam 238. A follower roller on arm 1242 (Fig. 39) cooperates with nine equally spaced detents in a detent cam 243 secured on shaft 185 and serves to center the shaft in each of its several positions.

When a card with a new grand group designation, i. e., departmental number, is sensed, the operation of mechanism additional to the above described mechanism is initiated. The additional mechanism is operated through four steps in four machine cycles and serves to cause two successive operations of the actuating mechanism whereby shaft 185 is rotated through two-thirds of a revolution in six steps during four machine cycles. It is apparent that this movement causes two successive three-step sequences of operation of cams 245 (Fig. 28), 246 (Figs. 27 and 29), and 186 (Fig. 32) for controlling first, a total conditioning cycle, second, a total taking cycle, third, the restoration of the control mechanism, fourth, a grand total conditioning cycle, fifth, a grand total taking cycle, and, sixth, the restoration of the control mechanism. In the first sequence, these cams cause the total to be taken from rear accumulator 51 in the manner described above. In the second, the additional mechanism serves to shift T link 190 to its grand total position and cams 245, 246, and 186 cause the grand total to be taken from accumulator 36. However, it will be noted that the third actuation of shaft 185 restores the total control mechanism to ineffective position and thereby tends to permit the resumption of ordinary accumulating operations in the cycle following the total taking cycle. To prevent this occurrence, the actuating mechanism is arranged so that the third step, which occurs at a time when the regular operating mechanisms hold card stop 9 in effective position, and hold picker knife 8 in retracted position, is followed immediately by the fourth step which controls the grand total conditioning cycle. By this arrangement, the departmental card with the new grand group designation is retained in the card chamber during the entire grand total taking operation, and, at the end thereof, the data contained in the new card is tabulated in the usual manner.

The card feed control cam 245 (see Figs. 24, 25, and 28) has a follower arm 244 which is connected by a link 247 to lever 248 which is secured to a stud shaft on which is secured a hook member 249. The link 29 in the driving mechanism for the card picker has a notch therein with which the hook member 249 is adapted to cooperate. When cam 245 is operated, lever 244 lowers the hook member into the path of the notch. Upon movement of the arm 21 link 29 and arm 13 to the right by cam 28, the hook engages the notch, thereby disabling the card feed.

The cam 246 (Figs. 25 and 27) has a follower arm 276 which is secured to shaft 25, which when rocked actuates the retract bail 24 to retract slides 19.

The cam 246 (Figs. 25 and 29) also has an arm 283 secured to a shaft 284 to which is secured an arm 286. The arm 286 is connected to the operating arm 287 of the card stop by a link 288. When the follower arm 283 rides on a high point of the cam 246 the card stop 9 is lowered into the path of the card.

The additional mechanism includes a sleeve 250 (Fig. 24) rotatably mounted on shaft 185, on which are secured an eight toothed ratchet 251, a scalloped cam disc 252 and a cam 253. In the arrangement shown herein, the construction is such that a complete revolution of sleeve 250 is completed in eight steps. Therefore, since the cams secured thereon perform their functions in four steps, each cam is provided with two separate working portions. Thus, after the sleeve 250 is actuated through four steps, the cams thereon are, in effect, returned to their original positions. Ratchet 251 (Fig. 34) is arranged to be actuated once during each cycle of the grand total taking operation by a pawl 254 pivoted on a spring-urged arm 255 which is pivotally mounted on stud 216 and is arranged to be operated by cam 210 and branch 256 of push rod 222. Pawl 254 is spring-urged against the ratchet and its extent of movement, when out of engagement with the ratchet, is governed by a limit stud 257 that coacts with a portion of arm 255. During accumulating cycles, a latch 258, pivoted on stud 227, engages a forward extension on arm 255 to hold the arm in its fully raised position wherein it is out of the path of movement of branch 256. When a grand group change of designation is sensed, an arm 259 on rock shaft 260 of the change of designation sensing mechanism, coacts with a roller on a vertical arm 261 of latch 258, which is urged clockwise by a suitable spring, and serves to disengage the latch from the forward extension of arm 255, whereby the arm is permitted to drop against branch 256.

When a card having a change in group designation, i. e., employee's number, is sensed, shaft 185 is rocked, as described above, to initiate a total taking operation. This occurrence, per se, is without effect on the mechanism on sleeve 250. However, the retraction of locking slides 19 releases pins 17 in the grand group designating columns as well as in the group designating columns. Thus, each adventitious change of designation that occurs during a total taking operation rocks shaft 260, as well as shaft 231, and disengages latch 258 from arm 255. Therefore, to prevent arm 255 from dropping against branch 256, during total taking operations, an auxiliary latch 263, similar in function and manner of operation to latch 233, is pivotally mounted on stud 227 and is arranged to engage arm 255 during total taking operations but is held out of engagement therewith when the control mechanism is at rest by stud 234, to which it is resiliently connected.

Disc 252 (Fig. 36), which serves to position sleeve 250 independently of shaft 185, and to disable the latches for arms 223 and 255 during grand total taking operations, is provided with two diametrically arranged deep notches 264 and six shallow notches 265. When the control mechanism is at rest, a follower roller on a lever 266, pivoted on stud 216, is held in a deep notch 264 by a spring 267. Lever 266 is provided with a forked forward extension comprising two branches 268 and 269 (see also Fig. 24) each of which has a forward face, adapted to coact with a stud 271 or 272 on its associated auxiliary latch 233 or 263, and a cutaway shoulder 273, adapted to coact with a stud 274 or 275 on the associated retaining latches 226 or 258. The arrangement is such that when sleeve 250 is rotated to place follower roller on lever 266 in register with a shallow notch 265, the lever is rocked counter-clockwise so that stud 271 and stud 272 are cammed forwardly by the forward face of branches 268 and 269, respectively, and studs 274 and 275 are cammed forwardly by the cutaway shoulders 273 on said branches 268 and 269, respectively, whereby auxiliary latches 233, 263 and retaining latches 226, 258, are held out of engagement with the forward extensions on actuating arms 223 and 255. At the fourth step of the disc 252, the follower roller rides into a deep notch 264, thereby rocking lever 266 clockwise to release retaining latches 226, 258 and auxiliary latches 233, 263, whereby the latches swing forwardly and engage and hold arms 223 and 255 in fully raised position.

Cam 253 (Figs. 24 and 37) which serves to shift total pull link 190 to its grand total position during the third cycle of a grand total taking operation, comprises two diametrically arranged, concentric high dwells and two concentric low dwells and serves to operate a lever 278 which is pivotally mounted on hollow shaft 237. The forward end of lever 278 is connected by link 279 to an arm on rock shaft 280 on the other end of which is mounted an arm 281. Connected thereto is a link 282 having a slot in its forward end that encompasses a stud in total pull link 190. When the control mechanism is at rest, a strong spring on link 282 urges the follower roller on arm 278 against the first portion of a low dwell on cam 253 and serves to hold total link 190 in "total" position in which a shoulder is engaged with stud 193. When the roller rides onto a high dwell of cam 253, lever 278 is rocked clockwise (Fig. 37) and serves to shift link 282 forwardly and permit a light spring, connected to the stud in the T link 190, to draw the link into its "grand total" position in which a shoulder thereon engages stud 200.

To restore cam slides 23 of the change of designation sensing mechanism to their rearward position at the end of total taking and grand total taking operations, an arm 285 (Figs. 24 and 33), having a rounded head portion adapted to coact with ratchet 218, is secured on rock shaft 231. During accumulating cycles, the rounded portion is held out of engagement with the ratchet due to the position of shaft 231. When the shaft is rocked at the start of either a total taking or grand total taking operation, the head portion is moved against a low portion of the ratchet. As the ratchet rotates, the arm 285 is positively elevated to rock shaft 231 clockwise and thereby cause bail rod 182 to shift slides 22 to their rearward position.

*Operation of control mechanism during total taking operation*

With the above described mechanism in mind, let it be assumed that after a group of cards containing an employee's number or some designation, is passed through the machine, a card having a new group designation, i. e., new employee's number, is passed into the sensing chamber. As sensing pins 12 (Fig. 25) are elevated to set digit stops in the computing mechanism, in accordance with the perforations in the new card, one or more of the slides 23 in the columns comprising the group designating field are shifted forwardly and, by means of interponent 181, bail rod 182, shaft 231, and arm 230 (Fig. 24), serve to rock latch 226 counter-clockwise to release arm 223 and initiate a total taking operation. As arm 223 drops downwardly against push rod 222, pawl 224 engages a tooth on ratchet 225. Immediately thereafter, cam 210 elevates push rod 222 to operate arm 223 and causes pawl 224 to rotate ratchet 225 through an angular distance equal to the pitch of one tooth and thereby rotate shaft 185 and the cams mounted thereon through one-ninth of a revolution. The movement constitutes the first step of a total taking operation and serves to convert the cycle, that began as an ordinary accumulating cycle, into a total conditioning cycle, in that—

1. Cam 245 (Figs. 24 and 28) is rendered effective to lock the card feeding mechanism in fully retracted position to prevent card feeding.

2. Cam 246 (Figs. 25 and 29), by means of arm 283 is rendered effective to retain card stop 9 in its lower position to hold the new card in the card chamber.

3. Cam 246 (Figs. 25 and 27), by means of arm 276, also serves to retract all locking slides 19 to release all pins 17 and prevent the setting of stops in the computing mechanism.

4. Cam 238 (Figs. 24 and 38), by means of arm 235 on lever 236, releases auxiliary latches 233, 263 and permits them to engage arms 223, 255 to retain the arms in elevated position.

During the conditioning cycle the computing mechanism is set to cause the total of the preceding group of cards to be taken from accumulator 51. At the end of the conditioning cycle, ratchet 218 (Figs. 24 and 33), having been shifted to place a tooth thereon in position to be engaged by pawl 217, is actuated by cam 209. This movement constitutes the second step of the total taking operation and serves to position the cams on shaft 185 for controlling the total taking cycle, in that, 1. Cam 245 (Figs. 24 and 28) retains the card feeding mechanism in retracted position.

2. Cam 246 (Figs. 25 and 29), by means of arm 283, continues to retain card stop 9 in its lower position.

3. Cam 246 (Figs. 25 and 27), by means of arm 276, continues to retain locking slides 19 in retracted position to prevent the setting of digit stops.

4. Cam 238 (Figs. 24 and 38) continues to hold lever 236 rocked whereby auxiliary latches 233 and 263 remain engaged with the extensions on arm 223 and 255 to retain the arms in their upper positions.

5. Cam 186 (Figs. 25 and 32) serves to pull link 190 downwardly and hold it in this position during the total taking cycle, whereby front total shaft 108 is rocked to control the total taking operation of the computing mechanism.

At the end of the total taking cycle, ratchet 218, having been shifted to place another tooth thereon in position to be engaged by pawl 217, is again actuated by cam 209. This movement constitutes the third step of the total taking operation and serves to restore the control mechanism to its rest position as shown in the drawings whereby, since the card feeding, card stop, and retract mechanism are returned to the control of their usual operating cams 28, 291, and 292, respectively, ordinary accumulating operations are resumed, and the card with the new group designation is tabulated in the cycle following the total taking cycle.

*Operation of control mechanism during grand total taking operation*

When a card with a new grand group designation, i. e., a new departmental number, is sensed, one or more of the slides 23 in the columns comprising the grand group designating field are shifted forwardly, and, by means of shafts 231 and 260, serve to rock latches 226, 258 counterclockwise to release arms 223 and 255 and initiate a grand total taking operation. As arms 223 and 255 drop downwardly against the branches of push rod 222, pawls 224 and 254 engage teeth on ratchets 225 and 251, respectively. Immediately after the beginning of the cycle, cam 210 elevates push rod 222 to operate arms 223 and 255 simultaneously, thereby causing pawl 224 to rotate ratchet 225 through an angular distance equal to the pitch of one tooth, whereby shaft 185 and the cams mounted thereon are rotated through one-ninth of a revolution, and causing pawl 254 to rotate ratchet 251 through an angular distance equal to the pitch of one tooth, whereby sleeve 250 and the cams secured thereon are rotated through one-eighth of a revolution. This movement constitutes the first step of a grand total taking operation and serves to set the several mechanisms for controlling a total conditioning cycle, in which the function of cams 245, 246, 186, and 238 are the same as during a total taking operation with the result that the new card is retained in the card chamber and accumulator 51 is conditioned for a total taking operation. However, since the roller on lever 266 (Fig. 24) is now in a shallow notch in cam 252, the cam faces and shoulders on extensions 268, 269 of lever 266 serve to hold auxiliary latches 233 and 263 and retaining latches 226 and 258 out of engagement with the extensions on arms 223 and 255, whereby said arms follow push rod 222 downwardly.

At the end of the total conditioning cycle, ratchet 218 (Fig. 24), having been shifted to place a tooth thereon in position to be engaged by pawl 217, is actuated by cam 209. This movement constitutes the second step of the grand total taking operation and serves to position the cams on shaft 185 for controlling the total taking cycle in the same manner as during a total taking operation, in which the last group total is rolled out of accumulator 51 during the forward movement of the actuating racks, printed on the report sheet, and transferred to accumulator 36 as the actuating racks are returned. Shortly after the beginning of the total taking cycle, cam 210 elevates push rod 222 to operate arms 223 and 255. Inasmuch as pawl 224 is now in register with a blank space on ratchet 225, the pawl moves idly and shaft 185 is not stepped. However, pawl 254, being in position to engage a tooth on ratchet 251, serves to rotate sleeve 250 through one tooth space relative to shaft 185. In this position of sleeve 250, disc 252 continues to hold the retaining and auxiliary latches out of engagement with the extensions on arms 223 and 255, and the roller of the total pull link shifting mechanism, continues to ride on the lower portion of cam 253.

At the end of the total taking cycle, ratchet 218, having another tooth thereon in position to be engaged by pawl 217, is again actuated by cam 209. This movement constitutes the third step of the grand total taking operation and serves to restore the cams on shaft 185 to their original position as shown in the drawings. In this position of the machine, as stated under the heading "Operation of control mechanism during total taking operations," the card stop and card feeding mechanism are returned to the control of their usual operating cams to permit resumption of ordinary accumulating operations. However, since retaining latches 226 and 258 and auxiliary latches 233 and 263 are held out of engagement with the extensions on the arms 223 and 255, the arms are in position to be actuated by push rod 222 to effect a second sequence of operations of cams 245, 246, and 186.

As shaft 15 continues to rotate, cam 210 elevates push rod 222 to cause pawl 224, which is now in position to engage a tooth on ratchet 225, to rotate shaft 185 through one tooth space. This movement constitutes the fourth step of a grand total taking operation and serves to position the cams on shaft 185 for controlling the grand total conditioning cycle, in which cam 245 is again effective to retain the card feeding mechanism in retracted position, and cam 246 again serves to retract locking slides 19 and to hold card stop 9 in its lowered position. The arrangement of cams 209 and 210 is such that, in a grand total taking operation, during the interval between the third actuation of shaft 185 under control of cam 209 and the fourth actuation of shaft 185 under control of cam 210, cam 28 serves to hold the card feeding mechanism in retracted position and cam 291 serves to hold card stop 9 in its lower position, whereby card feeding is suspended and the new card is retained in the sensing chamber. Thus, the cycle immediately following the total taking cycle, which would be an accumulating cycle if a change in group designations had been sensed, is converted into a grand total conditioning cycle during a grand total taking operation.

Simultaneously, with the actuation of shaft 185, arm 255 is elevated by branch 256 and causes pawl 254, which is engaged with another tooth on ratchet 251, to rotate sleeve 250 through one tooth space. This movement places the roller on arm 266 in register with another shallow notch 264 on disc 252 to hold the retaining and auxiliary latches disengaged, and places a high dwell on cam 253 in register to rock lever 278 clockwise, thereby shifting link 282 forwardly to permit its associated spring to shift T link 190 into its "grand total position."

At the end of the grand total conditioning cycle, ratchet 218, having been shifted to place a tooth thereon in position to be engaged by pawl 217, is actuated by cam 209. This movement constitutes the fifth step of the grand total taking operation and serves to position the cams on shaft 185 for controlling the grand total taking cycle, in which the grand total of the several group totals is rolled out of accumulator 36. During this cycle, cams 245 and 246 function, as above, to prevent card feeding, hold card stop 9 in effective position, and release locking slides 19, and cam 186 serves to pull T link 190 downwardly, whereby rear grand total shaft 206 is rocked to control the grand total taking operations of the computing mechanism.

Shortly after the beginning of the grand total taking cycle, cam 210 elevates push rod 222 to operate arms 223 and 255. Inasmuch as pawl 224 is now in register with a blank space on ratchet 225, pawl 224 is moved idly and shaft 185 is not stepped. However, pawl 254 being in position to engage a tooth on ratchet 251, serves to rotate sleeve 250 through one tooth space relative to shaft 185. This movement returns sleeve 250 to the position shown in the drawings, and places a deep notch 264 on disc 252 in position to permit lever 266 to be rocked clockwise to disengage the front faces and shoulders thereof from studs 271, 272 and studs 274, 275, respectively, whereby auxiliary latches 233, 263 and retaining latches 226, 256 are released and swing clockwise, under control of their respective springs, to engage the forward extensions on arms 223 and 255 and thereby retain the arms in fully raised position to prevent further actuation of sleeve 250 by pawl 254, and of shaft 185 by pawl 224.

At the same time, follower arm 278 rides off the high dwell of cam 253 and the spring on link 282 (see Fig. 37) tends to restore T link 190 to its "total" position. However, since cam 186 holds link 190 in its lower position, in which the rearward face of the shoulder abuts stud 193, link 190 remains engaged with stud 208 to hold rear grand total shaft 206 rocked throughout the cycle.

At the end of the grand total taking cycle, ratchet 218, having another tooth thereon in position to be engaged by pawl 217, is again actuated by cam 209. This movement constitutes the sixth step of the grand total taking operation and serves to restore the mechanism to the position shown in the drawings, in which the card feeding mechanism is released from the control of cam 245 and restored to the control of its usual operating cam 28; the card stop mechanism is released from the control of cam 246, and restored to the control of its usual operating cam 291; mechanism for retracting locking slides 19 is released from the control of cam 246 and restored to the control of its usual operating cam 292; total link 190, having been released by cam 186, is restored to "total" position; auxiliary latches 233, 263 are disengaged from the extensions on arms 223 and 255, by stud 234, leaving retaining latches 226, 258 to hold arms 223, 255 in raised position; and, since ratchet 218 has been stepped to place a blank space in register with pawl 217, arm 215 is operated idly during the succeeding accumulating cycles. Since the control mechanism is returned to its rest position at the time the sensing pin box is in its highest position, slides 19 lock pins 17 that were raised in accordance with the perforations in the new card, in their elevated position and they, in turn, set stops in the computing mechanism, so that the data contained in the card with the new grand group designation is tabulated in the cycle after the grand total taking cycle.

In a tabulating machine of the type disclosed there are two accumulators, one in the front directly associated with the rack sectors 35, and the second in the rear of the machine which is associated with the racks 49 and 50 which, in turn, are positioned by the sector. Totals are stored in the rear accumulator 51 and transferred to the front accumulator 36, where they are accumulated into grand totals.

The taking of totals from the rear accumulator is controlled by the shafts 108 and 207 (Fig. 2) and the taking of grand totals is controlled by the shafts 112 and 206.

The controls for the front accumulator 36, as shown in Fig. 7, comprise a fan cam 37 which is fixed on front drive shaft 34, this shaft being rocked from the rear drive shaft 33. Associated with the fan cam 37 (Fig. 7) is a rocker arm 54 having pins 55 and 56 thereon. The rocker arm is positioned on a fixed pivot and is adapted to be rocked by the fan cam 37 on its forward and rearward strokes. Connected to draw link 53 is an arm 52 having a cam slot cut therein in which is positioned the shaft of the accumulator 36. When the arm 52 is rocked to the left the cam will cause the accumulators 36 to be brought into mesh with the rack sector 35 and, when rocked to the right, the wheels are drawn out of mesh. In direct subtract or algebraic tabulators such as disclosed herein it is necessary that the front accumulators non-add during accumulating cycles. When group totals are taken, both accumulators 36 and 51 are engaged with their racks although not simultaneously. The amounts in the rear accumulators are transferred to the front accumulators. When a grand total is taken the rear accumulator 51 is disengaged from its racks and the front accumulator engaged. These control mechanisms are fully disclosed and described in the patent to W. W. Lasker et al., 2,124,177, and, therefore, they will only be described herein in sufficient detail to provide an understanding of the invention. Secured to the draw link 53 (Figs. 7 and 8) by a pin and slot connection is a link 295, which is pivotally connected at its lower end to a bell-crank 296 secured to a sleeve on the shaft 108. Also secured to the sleeve is a plate 297. Secured to the shaft 108 is an arm 295A in which is mounted a pin 298 which coacts with a latch member 299 pivotally mounted on shaft 112 and urged clockwise by a spring 299A. A pin 301 secured in the upper portion of the bell-crank 296 cooperates with a notch in the latch 299 until the front total shaft 108 is rocked at which time the pin 298 trips the latch, freeing the pin 301, permitting the bell-crank 296 to rotate counter-clockwise under the control of spring 302. This rotation of bell-crank 296 raises the link 295 to elevate the draw link 53 so that the pin 55 will engage the upper notch therein. It will be seen from the above that the draw link 53 is held in a mid-position until total shaft 108 is rotated.

In controlling the accumulators 36, if the draw link is lowered so that the lower notch therein engages the pin 56, any rocking of the rocker arm 52 by fan cam 37 on the forward stroke, i. e., to the left, will cause the arm 52 to be drawn to the left, thereby engaging the wheels with the rack sectors 35. On the return stroke of the fan cam the wheels will be withdrawn. If the arm 53 is raised, the reverse is true. The wheels remain out of mesh until the pin 55 engages the upper notch which will not occur until the end of the forward stroke of the fan cam, but on the rearward stroke the wheels will be thrown into mesh due to the pull to the left of draw link 53.

The control of the rear accumulator 51 is effected by a cam 305 on the drive shaft 33 (Fig. 9) which actuates bell-cranks 306 and 307. These bell-cranks cooperate with a pin 308 in a link 309 connected to bell-crank 310 secured to the shaft 311. Secured to shaft 311 is an arm 312 (Fig. 7) on which is pivotally mounted a T link 60. In view of the fact that the subtraction racks 49 are not used in the designating unit of the tabulator in which the present invention is embodied, none of the subtraction controls for the T link 60 are described. In the rear accumulator mechanism of the designating unit shown herein, a spring urged arm 313A (see Fig. 2) and a link 313B are provided to hold the link 60 in engagement with pin 59. In the normal position the accumulator 51 is in mesh with the add rack 50, due to the action of the T link on pin 59 in bell-crank 314 which is pivoted at 315 midway between pins 59 and 58. Connecting the bell-crank 314 to the shaft 57 of the accumulator 51 is a link 316. When the shaft 311 is rocked clockwise, the link 60 is moved to the left, the arm 314 rocks counter-clockwise under the action of spring-actuated arms 313 (Fig. 2) to raise the wheels 51 out of mesh with racks 50. The pin 308 is positioned by an arm 317 under control of rear total shaft 207. When shaft 207 is rocked in a counter-clockwise direction, the arm 317 shifts pin 308 out of the path of the bell-crank 307, and into the path of crank 306 which is rocked 180° later than 307, thereby leaving the accumulator 51 in mesh with the rack 50 during the first half of the cycle and permitting it to draw out of mesh during the latter half of the cycle.

Formed on the bottom of the bell-crank 310 is a lug 319 which is adapted to latch with a crank-shaped hook member 320, thereby holding the accumulator 51 out of mesh with the rack 50. This latch is only effective during the taking of grand totals. Secured to the rear grand total shaft 206 is an arm 321 and a link 322, which is adapted to position hook member 320 in effective position.

When the designation number is sensed from the card, the stops 30 are set and the rack sectors are permitted to swing forward until limited by the stops. The cam 305 withdraws the accumulator 51 from mesh with the rack 50, due to the fact that the pin 308 is positioned in the path of the bell-crank 307. The accumulator remains out of mesh during the first 180° of that cycle. At the end of this time the cam 305 no longer controls bell-crank 307, and the wheels 51 are meshed with racks 50, thus storing the number therein. The draw link 53 remains in normal position, thus the accumulator 36 does not mesh with gear sector 35 and no numerals are stored therein.

When it is desired to take a total from the rear accumulator 51, i. e., a change of designation in the employee's number occurs, the T-link 190 is drawn down by cam 186 and the head engages the pin 193 on arm 194, rotating it counter-clockwise thereby pulling link 197 downward to rotate shaft 108 in a clockwise direction. The shaft 108 rotates the rear total shaft 207 through the medium of link 325. The rotation of shaft 207 raises pin 308, as described above, thereby leaving the accumulators 51 in mesh with racks 50 during the first half of the cycle. The rotation of shaft 108 also permits the elevation of the draw link 53, as described above. When the fan cam 37 is rotated forward, the rocker arm 54 is ineffective. On the return stroke, however, the draw link 53 is actuated, throwing the accumulator 36 into mesh with the sector 35. When the sectors are released, the accumulator 51 limits the movement of the sectors to position them in accordance with the employee's number. On the return stroke, the number is transferred from the sectors 35 into the front accumulators.

During the first portion of a grand total taking operation, i. e., when the Department number changes, the shaft 108 is rocked to take a total from the rear accumulator and transfer it to the front accumulator as described above. During the latter portion of the grand total taking operation the cam 253 causes the link 279 (Fig. 3) to be pulled, which shifts the T-link 190 to the left through the medium of arm 281 and link 282. When the cam 186 causes the link 190 to be drawn down the head engages the pin 200 in the arm 201, rotating the arm in a clockwise direction, which, in turn, rocks arm 203 and pushes link 204 to the right, rocking shaft 206 (see Fig. 7) in a counter-clockwise direction. The rocking of shaft 206 rocks shaft 112 clockwise through the medium of link 326 and also rocks the arm 293 which through the link 294 rocks plate 297, in turn depressing arm 296 to pull the draw link 53 down by means of link 295 and spring 293. This movement of link 53 engages pin 56 with the lower notch so that, when the rocker arm 54 is engaged by fan cam 37 on its forward stroke, the accumulators 36 are meshed with the sectors 35 to take a grand total. In the rear accumulators the pin 308 (see Fig. 9) is in the path of bell-crank 307 and, during the first 180°, the shaft 33 is rocked, drawing the accumulator 51 out of mesh with the rack 50. The shaft 206 being rocked at this time, as described above, positions the latch member 320 to engage the lug 319 to hold the accumulators disengaged until the end of the cycle, at which time the shaft 206 is again rocked, unlatching the arm 310. During the last 180°, the front accumulator is disengaged by the return of the fan cam 37. This operation clears the front accumulator.

The mechanism of the present invention comprises the following groups:

1. That for rendering the change of designation mechanism effective.
2. That for identifying the designation field.
3. That for controlling the accumulator mechanism during accumulating and during total taking.
4. That for normalizing the non-add mechanism.

5. That for normalizing the non-add slides after grand total operation.

6. That for blocking out the amounts standing on the grand-total accumulator in the employee's field.

The rack sectors 35 and their associated print arms 40 are arranged in groups as disclosed and described in the patent to William W. Lasker, No. 1,388,271. This patent also discloses a device whereby any one of the groups may be used as a designating group, in which a designation character may be printed that is common to all the record cards of a certain series being printed; which group at a certain setting may, without further manipulation, print the designation character when the first card is being passed through the machine, will enter such character to the front accumulator, discontinue the operation of the accumulating means after such first entry, permit printing the same designation for the remaining cards of the series, and then upon the passage through the machine of a total card, which is equivalent to a change of designation in the instant machine, again actuate the accumulating means and cause the stored designation previously entered therein to be printed during the total taking cycle, along with the totals of the quantitative data stored in the other accumulators. The use of such a mechanism assures the non-adding of the designatory data from all but the first card in each group from which a total is to be taken, and resets automatically to repeat its performance after a total is taken. In this reference patent this mechanism is located adjacent the front accumulators and front total shaft and is used for suppressing the operation of the front accumulator. In the present tabulator, which has front and rear accumulators, the front accumulators are for grand totals and the rear accumulators are for totals, therefore, it is necessary that a somewhat similar device be provided which is located adjacent the rear accumulators to enable selective suppression thereof.

The mechanism for conditioning the rear accumulator of the designating unit to non-add the designations on the cards of a group subsequent to the first card in the group is shown in Figs. 42 and 43. It has previously been explained that as long as the T-shaped accumulator shift link 60 is engaged with the stud 59, known mechanism in the standard direct subtraction tabulator conditions the associated rear accumulator to add during tabulating cycles. But, if the accumulator shift link 60 associated with the rear accumulator of the designating unit is moved into neutral position, that is, out of engagement with either the stud 59 or 58, before the type sectors 40 begin their return stroke during any cycle, the rear accumulator of that unit is conditioned to non-add the data that otherwise would be entered therein during that cycle. Means are, therefore, provided for moving the accumulator shift link 60, associated with the rear accumulator of the designating unit, into neutral position at the proper time during the cycle in which the second card of each group is being sensed. This mechanism also retains the link 60 in neutral position while the remaining cards of the same group are being sensed, and returns it into engagement with the stud 59 only after the next total operation.

A slotted slide 330 (Figs. 42 and 43) slidably mounted on studs 331 and 332 is limited in its downward movement by stud 332. The slide 330 is adapted to be raised by an actuating pawl 333 and to be held in the position to which it is raised by a retaining pawl 334. The actuating pawl 333 is actuated during each machine cycle by a linkage controlled by cam 335 fixed to the continuously rotating main head shaft 33. This linkage consists of a spring biased arm 336 pivoted on shaft 200 and provided with a roller 337 cooperating with cam 335, a link 338 connecting arm 336 to an arm 340 fixed to a shaft 341 and an arm 342, fixed to shaft 341, on which the actuating pawl 333 is pivoted. A spring 343 tensioned between the arm 342 and the lower end of the actuating pawl biases the pawl against the associated teeth of slide 330 and affords the required play for the pawl. The retaining pawl 334 is pivoted on a shaft 344 and is biased towards the associated teeth of the slide 330 by a spring 345.

An arm 346, having one end pivoted on stud 347 and the other end biased in a counter-clockwise direction by a spring 348, is resiliently connected to slide 330 by a spring 351 tensioned between a stud on arm 346 and a stud on the slide. It will be evident that the actuating pawl 333 raises the slide 330 against the tension of the spring 348. An upper non-add arm 350 is also pivoted on stud 347 and has a depending lug 353 thereon adapted to engage a stud 354 in a lower non-add arm 355. The lug and stud are held in cooperative relation by a spring 356 which is tensioned between studs 357 and 358. A stud 360 in the rear end of the accumulator shift link 60 is disposed between arms 350 and 355 and will, therefore, swing link 60 about its pivot on arm 312, as will appear later in the explanation of the operation. Studs 361 and 362 are provided to limit the spread of non-add arms 350 and 355. It will be evident that the yielding spring 351 is provided for the purpose of permitting slide 330 to move relatively to the arm 346 when further upward movement of arm 346 is prevented by the limiting of upper non-add arm on stud 361, as illustrated in Fig. 43.

Let it be assumed that the slide 330 is in its lowermost position and that the actuating pawl 333 and the retaining pawl 334 are effective. During the cycle in which the first card of a group is sensed, the cam 335 causes the actuating pawl 333 to raise slide 330 one step in which position it is held by retaining pawl 334 (as in Fig. 42). This movement of slide 330 raises arm 346 through spring 351 but this movement of arm 346 is merely lost motion which takes up the play between the upper edge of the arm and the stud 357 in upper non-add arm 350. During the cycle in which the second card of a group is sensed, the cam 335 causes the actuating pawl 333 to raise the slide 330 a second step in which position it is held by retaining pawl 334 (as in Fig. 43). Upon the second step of slide 330, however, arm 346 engages stud 357 and rotates the upper non-add arm 350, and this arm, in turn, actuates the lower non-add arm 355, bringing the ends of these arms towards each other in scissor-like fashion. When these two arms are brought together during the cycle in which the second card of a group is sensed, they confine the sweep of the stud 360 in the accumulator shift link 60 so that the hooked end of the shift link cannot engage with either the add stud 50 or subtract stud 58. This scissor-like action of the non-add arms occurs before the type sectors 40 begin their return stroke, at about 50° of the cycle, in which the second card of a group is being tabulated, and accordingly the rear accumulator of the designation unit is conditioned to non-add the designation on the second card in each group. As each subsequent card in the same group is tabulated, the actuating pawl 333 raises the slide 330 slightly relative to the arm 346. However, as there are no further teeth on the slide with which the retaining pawl 334 can cooperate, the slide 330 drops back into its uppermost position, two steps above its normal position, under the influence of spring 348. The rear accumulator of the designation unit is thus conditioned to non-add the designations on the remaining cards in the same group.

The slide 330 is restored to its normal or lowermost position after each total and grand total operation. The reason for restoring the slide to its normal position after a grand total operation may be readily explained. When a grand total is initiated, successive total and grand total operations take place. If the slide 330 were restored only after a total operation, it would be raised two steps during the grand total operation, for, as is well known, two machine cycles are required to effect a grand total operation. Accordingly, if the slide 330 were not restored to normal after a grand total operation, the rear accumulator of the designating unit would be improperly conditioned to non-add the first card of the next group of cards tabulated.

The mechanism for restoring the slide 330 to normal after total and grand total operations is illustrated in Fig. 44. The actuating pawl 333 and the retaining pawl 334 are connected by a link 364. An arm 365, fixed to shaft 367, carries a stud 366 which disengages the actuating and retaining pawls from the teeth of the slide 330 when shaft 367 is rocked in a clockwise direction, as viewed in Fig. 44. Means actuated from the known total control shaft 185 rocks credit balance shaft 240 counter-clockwise, as viewed in Fig. 44, during total and grand total operations. Shaft 240 when thus rocked rocks shaft 367 clockwise through a linkage consisting of arm 3701, fixed to shaft 240, and a link 371 connecting arm 3701 to an arm 372 fixed to shaft 367. It will, therefore, be evident that the rear accumulator of the designating unit is reconditioned to add the designations of the first card of each group, whether the tabulation of the first card follows a total or a grand total operation.

The means for preventing transfer of designations from the rear to the front or grand total accumulator of the designation unit during group total operations subsequent to the first such operation following a grand total operation is shown in Figs. 40, 41, 44, and 45. Cooperating with the draw link 53 associated with the front or grand total accumulator 36 of the designation unit is a universal slide 370. This slide is suitably supported for vertical movement and is biased in an upward direction by a spring 384. When this slide is moved two steps below its extreme upward position, it cooperates with a stud 3720 on the draw link 53 to hold the link in a neutral position in which neither the upper stud 55 nor the lower stud 56 on the reverse arm 54 can cooperate with the notches in the shift link. But when the slide is either in its extreme upward position or one step below this position, it does not affect the position of the shift link. An actuating pawl 375 is provided for lowering the slide 370 and a retaining pawl 374 is provided for holding the slide in the position to which it is moved by the actuating pawl. The retaining pawl 374 is pivoted on stud 376 and is provided with a bent-over portion which lies in front of the stem of the actuating pawl 375. The actuating pawl 375 is pivoted on frame 377 to which is secured an arm 378 fixed to the total shaft 108. Biasing spring 381 biases the actuating pawl towards the teeth on the universal slide 370 and a similar biasing spring biases the retaining pawl 374 towards these same teeth.

Let it be assumed that the universal slide 370 is in its uppermost or normal position and the actuating pawl 375 and the retaining pawl 374 are in engagement with the teeth of the universal slide. At this time, the draw link 53 is in its neutral position and the front accumulator 36 of the designating unit is, therefore, conditioned to non-add.

When the first group total occurs after cards of employee "123" have been tabulated and total shaft 108 is rocked, the shift link 53 is released from its neutral position and is raised into accumulating position, as heretofore described. When the total shaft 108 rocks to initiate the total operation, the actuating pawl 375 pulls the slide 370 downward one step and the slide is retained in this position by the retaining pawl 374. This first downward step of the universal slide 370 is without effect on the draw link 53, which remains in add position during the total cycle. As a result, the total taken from the rear accumulator of the designation unit is transferred to the front accumulator of this unit upon the return stroke of the rack sectors 35. At the end of the group total operation, the mechanism controlled by the total shaft 108 returns the shift link 53 into neutral position, thereby conditioning the front or grand total accumulator of the designation unit to non-add during the tabulation of the second group of cards, in the present instance, during the tabulation of the cards of the employee "124."

When the second group total is initiated after the cards of employee "124" have been tabulated and the total shaft 108 is again rocked, the mechanism controlled by this shaft is rendered effective and the draw link 53 tends to rise into add position. But the rocking of the total shaft 108 also causes actuating pawl 375 to lower universal slide 370 an additional step where it is held by retaining pawl 374, and in this position of the slide it engages stud 3720, thereby lowering draw link 53 into neutral positon. Accordingly, when the second group total is taken, the total standing in the rear accumulator of the designation unit is not transferred to the front or grand-total accumulator of that unit.

The universal slide 370 then retains the draw link 53 in non-add position during subsequent tabulating and group total cycles, thereby preventing further entry or transfer into the front or grand total accumulator 36 of the designation unit.

Means are provided for releasing the universal slide 370 upon the occurrence of a grand total operation, thereby preparing the front or grand total accumulator 36 of the designation unit to be conditioned to add during the first group total operation following the grand total operation. This means consists of link 382 having one end connected to retaining pawl 374 and the other end connected by a lost motion connection to an arm 383 fixed to the front grand total shaft 112. When a grand total is initiated and the grand total shaft 112 is rocked, the pawls 374 and 375 are disengaged from the teeth of universal slide 370, thereby allowing the slide to be raised by spring 384 to its uppermost position. But the draw link 53 is not raised to add position by the rise of slide 370, for when the grand total shaft is rocked, known mechanism controlled by the rocking of grand total shaft 112 lowers the draw link so that the lower stud 55 on reverse arm 54 engages the notch in the lower edge of the shift link. Accordingly, the front or grand total accumulator 36 of the designation unit is conditioned for total-taking with clearing during the grand total-taking operation. As previously stated, other means well known in the art condition the rear accumulators to non-add during the grand total operation so that a grand total is taken from the front accumulators only. After a grand total has been taken, the front accumulators are returned into non-add position and the rear accumulators, as previously explained, are returned to add position, thereby conditioning the tabulator to proceed with the tabulation of the next group of cards, in the present instance, the cards of employee 125.

The mechanism for optionally rendering effective the mechanism which conditions the rear accumulator of the designating unit to add the designations on the first card only of each group and for rendering effective the mechanism which prevents the transfer of designations from the rear to the front accumulator of the designation unit during total operations subsequent to the first such operation following a grand total operation will now be described. This mechanism is illustrated in Figs. 44 and 45. This mechanism is under control of push rod 380 which is mounted in such a manner as to be readily accessible from the front of the machine as may be seen from Fig. 1. The inward end of the push rod 380 terminates in a slotted end piece 373. Loosely mounted on shaft 341 is a lever 385 having its upper end provided with a stud cooperating with the slot in end piece 373 and having its other end connected by link 386 to the lower end of retaining pawl 334. The shank of rod 380 is provided with a finger 3801 which is adapted to engage a pin 3802 on the front edge of the retaining pawl 374 associated with universal slide 370. A leaf spring 387 cooperates with a collar 3871 on the rod 380 to retain the rod in the position to which it is set.

From the structure just described, it is evident that when rod 380 is pushed in, as shown in Fig. 44, the pawls 333 and 333 are held out of engagement with the teeth of slide 330 while the pawls 374 and 375 are held out of engagement with the teeth of slide 370. The rod 380 is in this position when the tabulator is being used apart from the summary punch. When it is desired to condition the designating unit of the tabulator so that the tabulator may be used with a summary punch, the rod 380 is pulled out, as shown in Fig. 45, thereby bringing the pawls 334, 333, 374, and 375 into cooperative relation with the slides 330 and 370.

The mechanism for selecting the total or employee field of the designating unit is illustrated in Figs. 47 and 48 and consists of detent rack stops 391 and 392 and detent springs 393. Detent stops 391 and 392 are supported by a suitable frame 390 disposed between the side frames of the designating unit #1. Detent springs 393 are secured to the cross bar 393 which guides and carries the rack stops. When a rack stop 391 or 392 is depressed, the lower end thereof is interposed in front of an upturned ear 394 on one of the adding racks 50 associated with the rear accumulator of the designating unit.

The mechanism for blocking out the amounts accumulated in the total or employee field of the rear accumulator in the designation unit during grand total operations comprises an arm 394A, fixed to the rear grand total shaft 206, and is connected by link 395 to one arm of a bell-crank 396 which has its other arm connected by link 397 to an arm 398 fixed on shaft 399. Accordingly, when shaft 206 is rocked in a clockwise direction, as viewed in Fig. 47, during a grand total operation, the shaft 399 is rocked in a counter-clockwise direction, whereupon arm 398, fixed to shaft 399, engages stud 379 fixed to frame 390 thereby lowering the frame so that any of the stops 391 or 392 that are in the lower detent position will block the movement of the racks 50.

*Summary of operations*

The mechanism of the present invention having been described, as well as the mechanism of the direct subtraction tabulator and the summary punch so far as such mechanism is essential to an understanding of the invention, the operation of the machine will now be described. It will be assumed that the rod 380 is pulled out and that the summary punch is aligned in a proper manner with the tabulator, as illustrated in Fig. 1.

Since the timing diagrams in Figs. 50–53, inclusive, will be used in describing the operation it is to be noted that Figs. 50 and 51 combined form a chart for the tabulator during a total taking operation. With Fig. 52 inserted between the "total" and "normal" cycles in Fig. 51, the Figs. 50, 51, and 52 combined form a diagram of the timing during a grand total taking operation.

When the first card of employee 123 is sensed a change of designation in both the department and employee fields occurs, thereby initiating successive group total and grand total operations in the manner heretofore described.

To clarify the manner of operation of the above described mechanisms, the several operations incident to the taking of group and grand totals are briefly reviewed with reference to Figs. 50, 51, 52, and 53. During the taking of the group total, the following operations occur:

(1) The card picker 8 is disabled at about 20° (Figs. 50 and 51) of the idle cycle before the total taking cycle. The card stop is fully down at 211° of the add cycle and is held down during the idle and total cycles; (2) The rear accumulators are conditioned for total taking by the pulling of the T link 199 at about 345° of the idle cycle; (3) The front accumulators are conditioned to add and to receive a transfer of the total standing in the rear accumulators by being held in contact with the sectors 35 during the latter portion of the total cycle; (4) The slide 330 is restored to its lowermost position by the withdrawal of pawl 334 at about 60° of the cycle; (5) The universal slide 370 is moved one step from its extreme upward position at about 50° of the total cycle, but this does not interfere with the draw link 53 which continues to condition the front accumulator of the designation unit to add; (6) The rack sectors 35 and type sectors 40 are advanced and then retracted to their normal position, thereby causing the total standing in the rear or total accumulator of accumulating unit #2 to be printed; (7) The slides 19 are held retracted from about 85° of the idle cycle to 290° of the total cycle to prevent entry of data during total taking;

(8) The rocking of shaft 106 at about the start of the total cycle actuates link 106 through the interponent 103 to trip the clutch 89 at about 7° of the total cycle. This action rocks the shaft 90 (Fig. 2) in a counterclockwise direction lowering the feelers 73 until about 140° of the total cycle at which time the pawls 67 are released to hold the sectors in sensed position relative to the frame 62. The shaft 90 then rocks in a clockwise direction bringing the step sectors into position at about 260° of the cycle to set the slides 76 in accordance with the totals taken from the rear accumulators; (9) The bar 132 is shifted rearwardly, tripping the punch clutch 134 at about 250° of the cycle causing the punch to go through a single cycle of operation. During this cycle of operation the following operations occur. A blank card is fed into the punching chamber and arrested in a position below the punch gags at about 105° of the punch cycle. The slides 76 are moved forward by cam 168 from 0° to 90° of the punch cycle, and are arrested by the steps of the storing sectors 65, thereby positioning the interponents 167 above predetermined connection wires in the translator, after which cam 169 lowers the interponents and connection wires at about 180° of the cycle, thereby setting the punch gags in accordance with the totals taken from the rear accumulators. The blank card is then punched in accordance with the data represented by the setting of the punch gags. The punch basket 151 reaches the full punching position at about 313° of the cycle. The punched card is held in the punching chamber until substantially the end of the cycle, and is not completely ejected therefrom until approximately 50° of the next punch cycle. During the latter half of the punching cycle slides 76 are retracted by cam 168; (10) At the end of the group total operation, the front or grand total accumulators are conditioned to non-add and the rear accumulators are cleared and are conditioned to add.

During the taking of the grand total the following operations occur: (1) The rear or total accumulators are conditioned to non-add; (2) The universal slide 370 associated with the designation unit is released by pawls 374 and 375 and raised to its uppermost position at about 60° of the grand total cycle, but the shift link 53 is moved into its lowest position by other means responsive to the rocking of the front grand total shaft 112, thereby conditioning the front or grand total accumulator of the designation unit for total-taking. Similar means conditions the front or grand total accumulator of accumulating unit #2 for total taking; (3) The rack sectors 35 and type sectors 40 are advanced, causing a grand total to be taken from the front or grand total accumulators and printed on the record sheet; (4) The rocking of shaft 206 at about the start of the grand total cycle causes link 106 to actuate clutch 89 as above which causes the shaft 90 to be rocked counterclockwise (in Fig. 2), causing the storing sectors 65 to be positioned in predetermined positions relatively to the rocking frame mounted on shaft 61. The shaft 90 then rocks clockwise, thereby positioning the storing sectors to set the slides 76 in accordance with the grand totals taken from the front or grand total accumulators. The timing of these operations is the same as above; (5) The bar 132 is moved rearwardly, tripping the clutch 134, and causing the punch to go through a single cycle of operation during which a card is punched containing the grand totals taken from the front or grand total accumulators and the slides 76 are retracted.

The summary cards punched during the above mentioned group total operation and the grand total operation would be punched only if the front and rear accumulators are not cleared at the time the first card of employee 123 is sensed. If these accumulators are cleared at this time, the punch would be tripped during both the total and grand total operations, and two blank cards would be successively fed into the punching chamber, but as the punch is not ordinarily arranged to punch zeros, the two cards would be fed out of the punching chamber without being punched.

After the grand total cycle, tabulation is resumed and the first card of the first group, in the present instance, the first card of employee 123, is sensed. As the rear accumulators are now conditioned to add and the front accumulators to non-add, the employee designation 123 and the department designation 167 on this card are entered into the rear accumulator of the designation unit #1 and the number of hours worked on this card is entered into the rear accumulator of accumulating unit #2, but no entry is made into the front accumulators of these units. At about 50° of the first cycle during which the first card of employee 123 is sensed, the cam 335 causes slide 330 to be raised one step but this movement of the slide does not affect the rear accumulator of the designation unit which remains in add position during this cycle. Accordingly, the designations on the first card of employee 123, namely 167 and 123, are entered into the rear accumulator of designating unit #1 and the hours worked on this card are entered into the rear accumulator of accumulating unit #2. This result is indicated in the first line of the table in Fig. 49. During the cycle in which the first card of employee 123 is tabulated, the designations 167 and 123 are printed on the record sheet but the printing of the hours worked on this card is suppressed.

At about 50° of the second cycle, during which the second card of employee 123 is sensed, the cam 335 causes slide 330 to be raised a second step, thereby disengaging link 60 from stud 59. This prevents the rear accumulator of the designation unit from being reengaged with its actuating racks and thus conditions the rear accumulator of the designation unit to non-add the designations on the second card of employee 123. This result is indicated in the second line of the table in Fig. 49 in which it is set forth that the employee and department designations are non-added in the rear accumulator of the designation unit. The number of hours worked appearing on the second card of employee 123 is, however, accumulated by the rear accumulator of the accumulating unit. It is to be noted that printing from the record card of employee 123 and also from the subsequent cards of employee 123 is suppressed. The rear accumulator of the designation unit remains in non-add position during the third cycle, in which the third card of employee 123 is tabulated, and as indicated in the third line of the table in Fig. 49, the designations of this card are non-added in the rear accumulator of the designation unit #1. The number of hours worked appearing on the card, however, is entered into the rear accumulator of the accumulating unit #2.

When the first card of employee 124 is sensed, a change of designation occurs in the employee or total field and a group total operation is initiated. During this operation, the employee designation 123, the department designation 167, and the number of hours worked by employee 123, namely, 120, as set forth in the tables in the introduction, which stand in the rear accumulators of units #1 and #2, are transferred to the front accumulators 36, and are punched in a card by the summary punch which is tripped during this operation. These operations are indicated by the fourth line of the table of Fig. 49. It is to be noted that during this total operation, the number of hours worked by employee 123, namely, 120, is printed on the same line of the record sheet of the previously printed designations 167 and 123, but the printing of the designations from the rear accumulator of the designation unit is suppressed during this operation.

At the end of this group total operation, the front accumulators 36 are conditioned to non-add and the rear accumulators are cleared and conditioned to add. The rear accumulator of the designation unit was conditioned to add near the end of the total operation by the rocking of shaft 240 which caused the slide 330 to be restored to its lowermost position.

After the group total operation is ended, tabulation resumes and the second group of cards, in the present instance, the cards of employee 124, are tabulated. Again the designations of only the first card of the group are entered into the rear accumulator of the designation unit, as may be seen from the examination of the table, of Fig. 49, while the number of hours worked appearing on each card of the group is entered into the rear accumulator of the accumulating unit.

When the first card of employee 125 is sensed, a major or grand total change of designation occurs, as the department designation changes to 168, and successive group and grand total operations are initiated. Upon the initiation of the total operation, the rear accumulators are conditioned for total-taking and the front accumulator of the accumulating unit #2 is conditioned for adding. The front accumulator of the designating unit #1, however, is conditioned to non-add by the universal slide 370 which is moved to its second step below its extreme raised position. Accordingly, during the total cycle, the employee designation 124 and the department designation 167 standing in the rear accumulator of the designation unit are punched in a summary card, but they are not transferred to the front accumulator of the designation unit. The number of hours worked by employee 124, namely, 140, standing in the rear accumulator of the accumulating unit is not only punched in the same summary card as the employee and department designations but it is transferred to the front accumulator of the accumulating unit, which then contains a total of 260. These operations are indicated in line 9 of the table of Fig. 49. It is to be noted that the designations 167 and 124 are printed on the record sheet during the tabulation of the first card of employee 124, while the total hours worked by employee 124, are printed on the same line of the record sheet during the second total operation.

Upon the initiation of the grand total operation, the following operations occur. The rear accumulators are conditioned to non-add and the front accumulators are conditioned for total-taking, the release of universal slide 370 by the rocking of the front grand total shaft 112 being without effect on the shift link 53 which is pulled into its lowest position on the rocking of the front grand total shaft. The printing of a grand total from the portion of the front accumulator of the designation unit corresponding to the employee field is blocked by stops 391 and 392, but a grand total is printed from the portion of the front accumulator of the designating unit #1 corresponding to the department field and from the front accumulator of the accumulating unit #2. Thus, the department designation 167 is printed opposite the number of hours worked by employees 123 and 124, namely, 295. Likewise, a grand total summary card bearing the same data is punched by the punch which is tripped during the grand total operation. It may also be observed that the cam 335 raises slide 330 one step during the grand total operation, but at the end of that operation the rocking of shaft 240 permits slide 330 to restore to its lowermost position. The rear accumulator of the designation unit can thus be conditioned at the end of the grand total operation to add the designations of the first card only of the subsequent group, that is, the first card for employee 125. At the end of the grand total operation, the rear accumulators are, therefore, conditioned to add, while the front accumulators are again conditioned to non-add.

Tabulation again proceeds, and the cards of employee 125 are tabulated, the designations from the first card of this group being alone entered into the rear accumulator of the designation unit #1 and printed on the record sheet, but the number of hours worked appearing on each card of employee 125 being entered into the rear accumulator of the accumulating unit #2. Assuming that no cards follow the last card of employee 125, the machine will automatically stop after this card is sensed but before the number of hours worked appearing on this card is entered into the rear accumulator of the accumulating unit. By suitable manipulation of the start button provided on all Powers tabulators, the number of hours worked appearing on the card may be entered into the rear accumulator of accumulating unit #2, the card fed out of the machine, and grand total operations of the machine effected. As a result of these operations, the department designation 168, the employee designation 125 and the total hours worked by employee 125, or 140 hours, is transferred to the front accumulators and punched in a summary card, and the department designation 168, and the total 140 standing in the front accumulator of the accumulating unit #2 will be printed and punched in a grand summary card. These operations are indicated in the last two lines of the table of Fig. 49. It is again to be noted that during the above mentioned operation, the total number of hours worked by employee 125, namely 140, is printed on the same line of the record sheet as the previously printed designations 168 and 125.

At the end of this grand total operation the rear accumulators are cleared, the front accumulators of the accumulating units are cleared, and the portion of the front accumulator corresponding to the department field is cleared. But the portion of the front accumulator of the designation unit corresponding to the employee field will not be cleared, as the movement of the sectors corresponding to this portion of the front accumulator of the designation unit was purposely blocked to prevent punching of the amount 248 on the grand total summary card, and to prevent printing of this amount on the record sheet. The only time it is ever necessary to clear the portion of the front accumulator of the designation unit corresponding to the employee field is when the fields are reversed or when the designating unit is not used for summary card punch designation. Then it will be necessary to raise all the stops 391 or 392 to their upper detent position and trip a grand total before starting the new work.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new and desire to secure by Letters Patent is:

1. In a tabulator having a summary punch associated therewith, the tabulator provided with a total accumulator and a grand total accumulator as well as with a total shaft and means to enter major and minor designative data into the total accumulator and means to transfer said major and minor designative data to the grand total accumulator during a certain total taking operation and means to print said designative data, the combination of means for transmitting said major and minor designative data to said punch each time the total shaft is operated, disabling means associated with the transferring means and adapted, when operated after its first step, to prevent the grand total accumulator from receiving transferred designative data, and means operated by the total shaft to move said disabling means progressively to effective position by successive operations of said total shaft.

2. In a tabulator having a summary punch associated therewith, the tabulator provided with a total accumulator and a grand total accumulator as well as with a total shaft and a grand total shaft and means to enter major and minor designative data into the total accumulator and means to transfer said major and minor designative data to the grand total accumulator during a certain total taking operation and means to print said designative data, the combination of means for transmitting said major and minor designative data to said punch each time the total shaft is operated, disabling means associated with the transferring means and adapted, when operated after its first step, to prevent the grand total accumulator from receiving transferred designative data, means operated by the total shaft to move said disabling means progressively to effective position by successive operations of said total shaft, means operated when the grand total shaft is operated to restore said disabling means to normal position, and means for transmitting said major designative data from the grand total accumulator to said punch when the grand total shaft is operated.

3. In a tabulator having a summary punch associated therewith, the tabulator provided with a total accumulator and a grand total accumulator as well as with a total shaft and a grand total shaft and means to enter major and minor designative data into the total accumulator and means to transfer said major and minor designative data to the grand total accumulator during a certain total taking operation and means to print said designative data, the combination of means for transmitting said major and minor designative data to said punch each time the total shaft is operated, disabling means associated with the transferring means and adapted, when operated after its first step, to prevent the grand total accumulator from receiving transferred designative data, means operated by the total shaft to move said disabling means progressively to effective position by successive operations of said total shaft, means operated when the grand total shaft is operated to restore said disabling means to normal position, means for transmitting said major designative data from the grand total accumulator to said punch when the grand total shaft is operated, and a manually settable device for controlling the initiation of the operation of the punch by the total shaft alone, the grand total shaft alone, or by each of said total shafts.

ARTHUR G. RINDFLEISCH.